United States Patent
Tanaami et al.

(10) Patent No.: US 8,961,900 B2
(45) Date of Patent: Feb. 24, 2015

(54) CHEMICAL REACTION CARTRIDGE, METHOD OF PRODUCING CHEMICAL REACTION CARTRIDGE, AND MECHANISM FOR DRIVING CHEMICAL REACTION CARTRIDGE

(75) Inventors: Takeo Tanaami, Tokyo (JP); Hisao Katakura, Tokyo (JP); Yuji Mitsumori, Tokyo (JP); Hitoshi Hiramatsu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 2169 days.

(21) Appl. No.: 11/111,216

(22) Filed: Apr. 20, 2005

(65) Prior Publication Data
US 2005/0244308 A1 Nov. 3, 2005

(30) Foreign Application Priority Data

Apr. 28, 2004 (JP) .............................. P.2004-133060
Jul. 12, 2004 (JP) .............................. P.2004-204085

(51) Int. Cl.
*B01L 3/00* (2006.01)
*B01J 19/00* (2006.01)
(Continued)

(52) U.S. Cl.
CPC ......... *B01J 19/0093* (2013.01); *B01F 13/0059* (2013.01); *B01F 15/0201* (2013.01); *B01F 15/025* (2013.01); *B01L 3/50273* (2013.01); *B01J 2219/00783* (2013.01); *B01J 2219/00804* (2013.01); *B01J 2219/00833* (2013.01); *B01L 3/502707* (2013.01); *B01L 3/502723* (2013.01); *B01L 2200/0621* (2013.01); *B01L 2200/0684* (2013.01); *B01L 2200/10* (2013.01); *B01L 2300/0681* (2013.01); *B01L 2300/0816* (2013.01); *B01L 2300/0861* (2013.01); *B01L 2300/0864* (2013.01); *B01L 2300/0867* (2013.01); *B01L 2300/087* (2013.01);
(Continued)

(58) Field of Classification Search
USPC .......................................... 422/102, 103, 104
See application file for complete search history.

(56) References Cited

U.S. PATENT DOCUMENTS 4,007,010 A * 2/1977 Woodbridge, III ............. 422/50
4,065,263 A 12/1977 Woodbridge, III
(Continued)

FOREIGN PATENT DOCUMENTS

CN 2470820 Y 1/2002
CN 1390303 A 1/2003
(Continued)

OTHER PUBLICATIONS

German Office action issued Feb. 13, 2008.
(Continued)

*Primary Examiner* — Natalia Levkovich
(74) *Attorney, Agent, or Firm* — Sughrue Mion, PLLC

(57) ABSTRACT

A chemical reaction cartridge includes a vessel having at least one part made of an elastic body, in which a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction. At least a chamber into which the fluid substance is flowed has an air-release path which releases air from the chamber.

15 Claims, 27 Drawing Sheets

(51) Int. Cl.
 *B01F 13/00* (2006.01)
 *B01F 15/02* (2006.01)

(52) U.S. Cl.
 CPC .. *B01L2400/0481* (2013.01); *B01L 2400/0655* (2013.01)
 USPC .......................................... 422/503; 422/502

(56) References Cited

U.S. PATENT DOCUMENTS

| | | | | |
|---|---|---|---|---|
| 4,522,622 | A | * | 6/1985 | Peery et al. .................... 604/191 |
| 4,708,931 | A | | 11/1987 | Christian |
| 5,422,271 | A | * | 6/1995 | Chen et al. .................. 435/287.2 |
| 5,863,502 | A | | 1/1999 | Southgate et al. |
| 6,426,230 | B1 | * | 7/2002 | Feistel .......................... 436/165 |

FOREIGN PATENT DOCUMENTS

| | | |
|---|---|---|
| DE | 69213910 T2 | 7/1993 |
| DE | 43 41 862 A1 | 6/1994 |
| DE | 69305046 T2 | 4/1997 |
| DE | 100 01 116 A1 | 7/2001 |
| DE | 10041853 C1 | 2/2002 |
| DE | 102 22 478 A1 | 12/2003 |
| DE | 10 2004 023 217 A1 | 12/2004 |
| EP | 0803288 A2 | 10/1997 |
| EP | 1508368 A1 | 2/2005 |
| JP | 2001-70784 A | 3/2001 |
| JP | 2002-282682 A | 10/2002 |
| JP | 2002365299 | 12/2002 |
| JP | 2005-037368 A | 2/2005 |
| WO | 98/40466 A1 | 9/1998 |
| WO | 01/07892 A1 | 2/2001 |
| WO | 02/100543 A1 | 12/2002 |
| WO | 03/099428 A1 | 12/2003 |
| WO | 03/099988 A1 | 12/2003 |
| WO | 2004/011147 A1 | 2/2004 |

OTHER PUBLICATIONS

German Office Action dated Jan. 21, 2009.
Chinese Office Action dated Feb. 1, 2008.
Japanese Office Action for JP 2004-133060 dated Feb. 19, 2009.

* cited by examiner

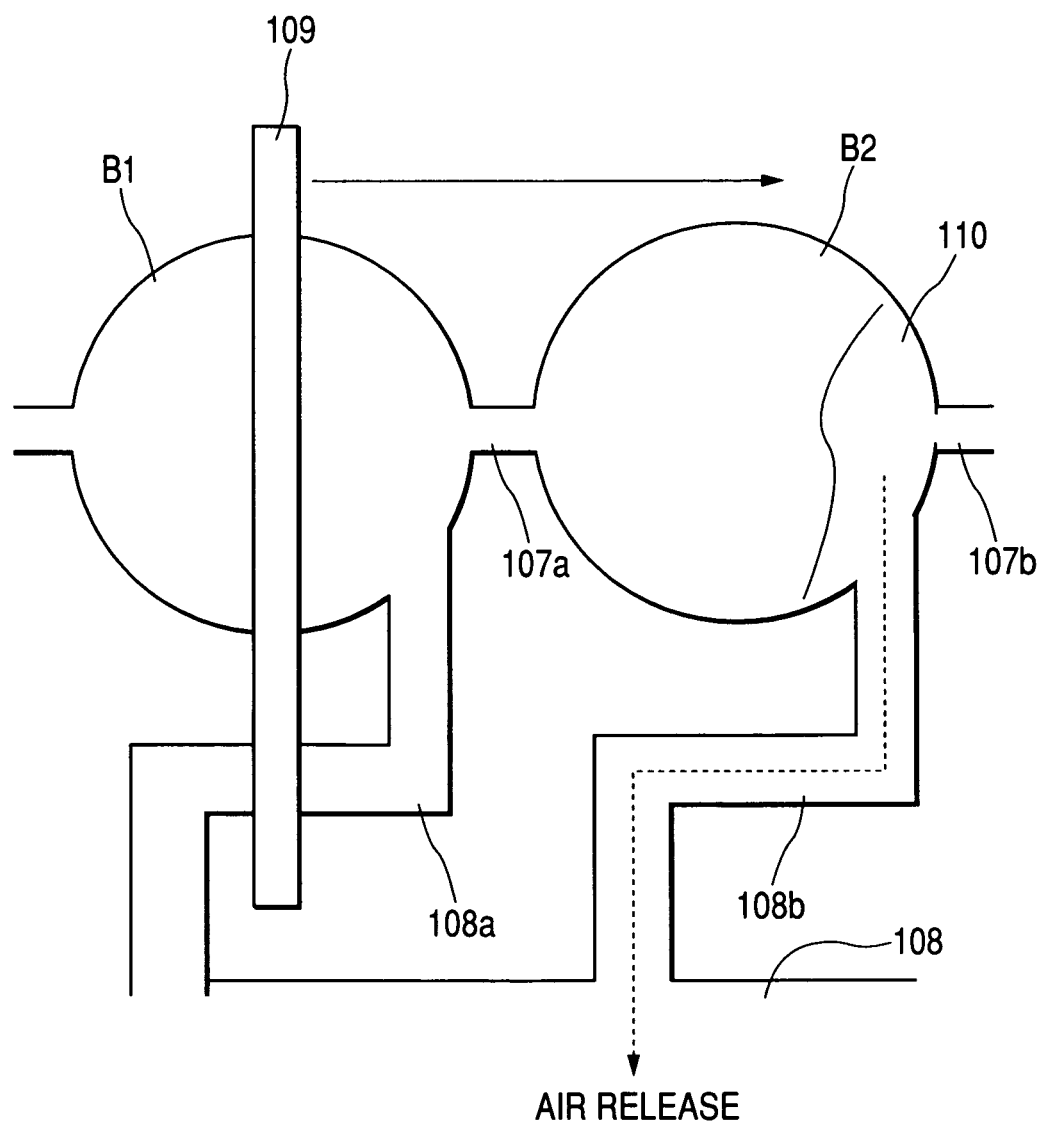

CHEMICAL REACTION CARTRIDGE, METHOD OF PRODUCING CHEMICAL REACTION CARTRIDGE, AND MECHANISM FOR DRIVING CHEMICAL REACTION CARTRIDGE

CROSS-REFERENCE TO RELATED APPLICATIONS

This application is based upon and claims the benefit of priority from the prior Japanese Patent Applications No. 2004-133060 filed on Apr. 28, 2004 and No. 2004-204085 filed on Jul. 12, 2004, and the entire contents of which are incorporated herein by reference.

BACKGROUND OF THE INVENTION

1. Field of the Invention

The present invention relates to a chemical reaction cartridge, a method for producing a chemical reaction cartridge and a mechanism for driving a chemical reaction cartridge. Particularly it relates to improvement in liquid supply structure concerned with synthesis, dissolution, detection, separation, etc. of a solution.

2. Description of the Related Art

Test tubes, beakers, pipettes, etc. are heretofore generally used for synthesis, dissolution, detection, separation, etc. of a solution. For example, substance A and substance B are taken in test tubes, beakers, or the like, in advance. The substances A and B are injected into other vessels such as test tubes or beakers and mixed and stirred to prepare substance C. The substance C synthesized thus is observed, for example, in terms of light emission, exotherm, coloration, colorimetry, etc.

Or the mixture substance may be filtrated or centrifugally separated to extract a target substance.

Glass instruments such as test tubes or beakers are also used for dissolution such as dissolution in an organic solvent. In the case of detection, a test substance A and a reagent are likewise put in a vessel and a result of reaction is observed.

On the other hand, a bag called "biochip" made of a flexible material and shaped like a flat bag is used in a bio-analyzer or the like (e.g. see JP-A-2002-365299).

JP-A-2002-365299 is referred to as a related art.

FIGS. 27A and 27B are configuration views of a biochip described in JP-A-2002-365299. FIG. 27A is a sectional view of the biochip. FIG. 27B is a plan view of the biochip. A flat blood collecting bag 41 having peripherals sealed hermetically has a center portion shaped like a fish-like bag. An opening portion of the fish-like bag is blocked with a rubber stopper 42.

In the blood collecting bag 41, a picking portion 43, a pre-treatment portion 44, a connection portion 45 and a waste storing portion 47 are formed successively when viewed inward from the stopper 42. To collect blood, the stopper 42 is inserted into an injector (not shown). In the inside of the injector, an injection needle protrudes out so as to pierce the stopper 42.

To collect blood, a subject is pierced by a pointed end of the needle protruding out of the injector and a hook 431 of the blood collecting bag 41 is stretched outward so that blood is collected in the picking portion 43. After blood is collected, the injector is removed from the blood collecting bag. Then, as shown in FIG. 28, the blood collecting bag 41 is clamped between rotary rollers 61 and 62 and moved from the picking portion 43 to the pre-treatment portion 44 so as to be squashed while pressed. The collected blood is transported into the pre-treatment portion 44.

When a pouch portion 48 begins to be squashed with the advance of the positions of the rollers 61 and 62, a solution in the pouch portion 48 breaks a valve 49 and flows into the pre-treatment portion 44. Then, a solution in a pouch portion 50 flows into the pre-treatment portion 44 in the same manner as described above. When a predetermined treatment in the pre-treatment portion is completed, the rollers are rotated so that the treated blood is transported into the connection portion 45.

A DNA chip 46 is disposed in the connection portion 45 for performing hybridization. Superfluous blood or solution pushed out from the pre-treatment portion 44 is reserved in the waste storing portion 47. The state of the DNA chip after hybridization is observed by a reader disposed in the outside.

In the background-art method using beakers, pipettes, etc., the operation is however troublesome and there is a problem in large personal error and much labor.

Moreover, in the case of a blood collecting bag, there is problem that a solution cannot be moved easily because the blood collecting bag is not elastic.

To solve this problem, there is an attempt to provide a vessel as a cartridge. Like the biochip, solutions are transported into chambers (hereinafter referred to as "wells") provided in the cartridge and connected to one another for performing a treatment such as mixing and chemical reaction. When the vessel is provided as a cartridge, there is however the following problems.

(1) When a solution is transported into a next well, the solution is mixed with air because air is contained in the next well in advance. Moreover, the solution is moved back by the back pressure of air.

(2) At the time of solution transport, the solution flows into not only the next well but also a well or flow path subsequent to the next well.

(3) At the time of heating and vibrating the solution, the solution flows out to other wells.

(4) When a sample is injected initially, air is mixed with the sample. Moreover, since the sample is injected manually, quantitativeness is poor (i.e. a predetermined amount of the sample cannot be used as an initial quantity for reaction).

(5) Although it is easy to obtain a mixture (A+B) of solutions A and B simply, for example, it is impossible to achieve a structure (cross structure) for extraction and purification of DNA from a sample by using silica, magnetic particles or the like.

SUMMARY OF THE INVENTION

The object of the invention is to provide a chemical reaction cartridge having high accuracy and high reproducibility, a method of producing the chemical reaction cartridge and a mechanism for driving the chemical reaction cartridge.

(1) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein at least a chamber into which the fluid substance is flowed has an air-release path which releases air from the own chamber.

(2) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein at least either of the flow path and the chambers is in zero volume before the fluid substance flows into the flow path or the chambers.

(3) The invention provides a method of producing a chemical reaction cartridge defined in the paragraph (2), having the step of: forming a non-adhesive portion non-adhesive to the flow path or the chambers when a rigid body and the elastic body are bonded to each other.

(4) In the method of producing a chemical reaction cartridge according to the paragraph (3), the non-adhesive portion is formed in such a manner that a non-adhesive substance is applied before bonding.

(5) In the method of producing a chemical reaction cartridge according to the paragraph (3), the non-adhesive portion is formed in such a manner that a corresponding region is masked or a substance not activated by plasma is applied to the corresponding region at a time of plasma adhesive treatment.

(6) In the method of producing a chemical reaction cartridge according to the paragraph (3), the non-adhesive portion is formed in such a manner that an adhesive agent is applied on a neighbor of a corresponding region but the adhesive agent is not applied on the non-adhesive portion.

(7) In the method of producing a chemical reaction cartridge according to the paragraph (3), the non-adhesive portion is formed as a non-adhesive surface in such a manner that an implantable material having at least one non-adhesive surface is embedded in the substrate.

(8) In the method of producing a chemical reaction cartridge according to the paragraph (3), the non-adhesive portion is formed in such a manner that an implantable material having at least one non-adhesive surface is set in a substrate or the elastic body hardened in advance and then a corresponding portion of the elastic body or substrate is molded by casting.

(9) The invention provides a mechanism for driving a chemical reaction cartridge having a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein the mechanism has pressurizing portions which simultaneously block all input and output flow paths connected to the chambers holding the fluid substance.

(10) The mechanism for driving a chemical reaction cartridge defined in the paragraph (1) or (2) has a pressurizing portions which simultaneously block all flow paths connected to the chambers holding the fluid substances.

(11) In the mechanism for driving a chemical reaction cartridge according to the paragraph (9), the pressurizing portions are rollers used for moving the fluid substance.

(12) In the mechanism for driving a chemical reaction cartridge according to the paragraph (10), the pressurizing portions are rollers used for moving the fluid substance.

(13) In the mechanism for driving a chemical reaction cartridge according to the paragraph (9), at least one of the pressurizing portions is a shutter.

(14) In the mechanism for driving a chemical reaction cartridge according to the paragraph (10), at least one of the pressurizing portions is a shutter.

(15) In the mechanism for driving a chemical reaction cartridge according to the paragraph (9), the fluid substance is blocked simultaneously at a plurality of places in one cartridge.

(16) In the mechanism for driving a chemical reaction cartridge according to the paragraph (10), the fluid substance is blocked simultaneously at a plurality of places in one cartridge.

(17) In the mechanism for driving a chemical reaction cartridge according to the paragraph (9), the fluid substance is blocked in accordance with each step of the chemical reaction.

(18) In the mechanism for driving a chemical reaction cartridge according to the paragraph (10), the fluid substance is blocked in accordance with each step of the chemical reaction.

(19) In the mechanism for driving a chemical reaction cartridge according to the paragraph (9), at least one of the pressurizing portions is moved after blocking the fluid substance to change an inner pressure of the chambers.

(20) In the mechanism for driving a chemical reaction cartridge according to the paragraph (10), at least one of the pressurizing portions is moved after blocking the fluid substance to change an inner pressure of the chambers.

(21) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein the plurality of chambers are arranged at regular intervals of a pitch, at least one of the chambers is a common chamber having a plurality of inlet flow paths into which different fluid substances, and at least one outlet flow path, and at least one of the chambers is a dummy chamber for adjusting a timing of transporting a predetermined fluid substance into the common chamber.

(22) In the chemical reaction cartridge according to the paragraph (1) or (2), the plurality of chambers are arranged at regular intervals of a pitch, at least one of the chambers is a common chamber having a plurality of inlet flow paths into which different fluid substances, and at least one outlet flow path, and at least one of the chambers is a dummy chamber for adjusting a timing of transporting a predetermined fluid substance into the common chamber.

(23) The mechanism for driving a chemical reaction cartridge defined in the paragraph (21), has a plurality of pressurizing portions provided in positions for blocking the flow paths of the chambers, wherein the plurality of pressurizing portions are moved simultaneously in one direction to thereby transport solutions pitch by pitch.

(24) The mechanism for driving a chemical reaction cartridge defined in the paragraph (22), has a plurality of pressurizing portions provided in positions for blocking the flow paths of the chambers, wherein the plurality of pressurizing portions are moved simultaneously in one direction to thereby transport solutions pitch by pitch.

(25) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein an entrance for the fluid substance is constituted by a plurality of injection portions connected in its inside, and the fluid substance is injected from one of the injection portions to release air from another injection portion.

(26) In the chemical reaction cartridge according to the paragraph (1) or (2), an entrance for the fluid substance is constituted by a plurality of injection portions connected in its inside, and the fluid substance is injected from one of the injection portions to release air from another injection portion.

(27) The invention provides a chemical reaction cartridge including a vessel having at least one part made of an elastic body, wherein a plurality of chambers formed in the vessel so as to be connected or arranged connectably through a flow path, and an external force is being applied to the elastic body from an outside of the vessel to move a fluid substance in the flow path or the chambers or in both the flow path and the chambers so as to perform a chemical reaction, wherein the chemical reaction cartridge further has: an entrance for storing a predetermined amount of the fluid substance; and a sucking portion which sucks the predetermined amount of the fluid substance stored in the entrance, into an inside.

(28) The chemical reaction cartridge according to the paragraph (1) or (2), further has: an entrance for storing a predetermined amount of the fluid substances; and a sucking portion which sucks the predetermined amount of the fluid substance stored in the entrance, into an inside.

(29) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein at least one of the chambers is a common chamber having a plurality of inlet flow paths into which two or more kinds of different fluid substances flow respectively, and at least two outlet flow paths, and when one fluid substance flows into and from the common chamber, an inlet flow path for another fluid substance and the outlet flow paths are blocked by the external force.

(30) In the chemical reaction cartridge according to the paragraph (1) or (2), at least one of the chambers is a common chamber having a plurality of inlet flow paths into which two or more kinds of different fluid substances respectively, and at least two outlet flow paths, and when one fluid substances flows into or from the common chamber, an inlet flow path for another fluid substance and the outlet flow paths are blocked by the external force.

(31) In the chemical reaction cartridge according to the paragraph (29), the flow paths into and from which another fluid substance flows are formed in position to be blocked by an external force used for transporting the one fluid substance.

(32) In the chemical reaction cartridge according to the paragraph (30), the flow paths into and from which another fluid substance flows are formed in positions to be blocked by an external force used for transporting the one fluid substance.

(33) In the chemical reaction cartridge according to the paragraph (29), the plurality of chambers have convex portions which are provided in the outside of the vessel and which are pressed down when the external force is applied, and a flow path for transporting the one fluid substance are formed in concave portions between the convex portions.

(34) In the chemical reaction cartridge according to the paragraph (30), the plurality of chambers have convex portions which are provided in the outside of the vessel and which are pressed down when the external force is applied, and a flow path for transporting the one fluid substance are formed in concave portions between the convex portions.

(35) In the mechanism for driving a chemical reaction cartridge defined in the paragraph (29), a flow path into and from which the another fluid substance flows are simultaneously blocked by a wheel type pressurizing portion.

(36) In the mechanism for driving a chemical reaction cartridge defined in the paragraph (30), the flow path into and from which the another fluid substance flows are simultaneously blocked by a wheel type pressurizing portion.

(37) In the mechanism for driving a chemical reaction cartridge according to the paragraph (35) or (36), the wheel type pressurizing portion is moved or rotated and moved in a direction of an axis same with that of the pressuring portion for transporting the solution to block the flow path into and from which the another fluid substance flows.

(38) In the mechanism for driving a chemical reaction cartridge defined in the paragraph (29), an inlet flow path and an outlet flow path of the common chamber are radially formed from the common chamber, and a pressurizing portion for transporting a solution through the flow path is moved in directions of different axes in accordance with each flow path in a surface of the vessel.

(39) In the mechanism for driving a chemical reaction cartridge defined in the paragraph (30), an inlet flow path and an outlet flow path of the common chamber are radially formed from the common chamber, and a pressurizing portion for transporting a solution through the flow paths is moved in directions of different axes in accordance with each flow path in a surface of the vessel.

(40) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein at least one of the chambers is a common chamber having a plurality of inlet flow paths into which two or more kinds of different fluid substances flow respectively, and at least two outlet flow paths, and a plurality of flow paths passing through the common chamber are arranged in each of rear and front surfaces of the cartridge.

(41) In the chemical reaction cartridge according to the paragraph (1) or (2), at least one of the chambers is a common chamber having a plurality of inlet flow paths into which two or more kinds of different fluid substances flow respectively, and at least two outlet flow paths, and a plurality of flow paths passing through the common chamber are arranged in each of rear and front surfaces of the cartridge.

(42) The invention provides a chemical reaction cartridge including a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein at least one of the chambers is a common chamber having a plurality of flow paths through which two or more kinds of different fluid substances flow into and from the common chamber, the flow paths of the common chamber are arranged adjacently and linearly with the common chamber as its center, and when one fluid substance flows into and from the common chamber, a flow path into which another fluid substance flows, the common chamber is blocked by the external force.

(43) In the chemical reaction cartridge according to the paragraph (1) or (2), at least one of the chambers is a common chamber having a plurality of flow paths through which two or more kinds of different fluid substances flow into and from the common chamber, and the flow paths of the common chamber are arranged adjacently and linearly with the common chamber as its center, and when one fluid substance flows into and from the common chamber, a flow path into which another fluid substance flows, the common chamber is blocked by the external force.

(44) In the mechanism for driving a chemical reaction cartridge defined in the paragraph (42), a pressurizing portion for transporting the fluid substance into the common chamber is arranged to clamp chambers containing a fluid substance to be transported and is moved in a linear direction in a surface of the vessel.

(45) The invention provides a mechanism for driving a chemical reaction cartridge defined in the paragraph (43), wherein a pressurizing portion for transporting the fluid substances into the common chamber is arranged to clamp chambers containing a fluid substance to be transported and is moved in a linear direction in a surface of the vessel.

(46) The invention provides a chemical reaction cartridge including a vessel having at least one part made of an elastic body, wherein a plurality of chambers formed in the vessel so as to be connected or arranged connectably through flow path, and an external force is applied to the elastic body from an outside of the vessel to move a fluid substance in the flow path or the chambers or in both the flow path and the chambers so as to perform a chemical reaction, wherein the plurality of chambers are arranged at regular intervals of a pitch, at least one of the chambers is a common chamber having a plurality of inlet flow paths into which two or more kinds of different fluid substances flow respectively, and at least two outlet flow paths, and when one fluid substance flows into and from the common chamber, an inlet flow path into which another fluid substance flows are blocked by the external force.

(47) In the chemical reaction cartridge according to the paragraph (1) or (2), the plurality of chambers are arranged at regular intervals of a pitch, at least one of the chambers is a common chamber having a plurality of inlet flow paths into which two or more kinds of different fluid substances flow respectively, and at least two outlet flow paths, and when one fluid substance flows into and from the common chamber, an inlet flow path into which another fluid substance flows are blocked by the external force.

(48) In the mechanism for driving a chemical reaction cartridge defined in the paragraph (46), a pressurizing portion for transporting the different fluid substances is a group of pressurizing portions which move independently.

(49) In the mechanism for driving a chemical reaction cartridge defined in the paragraph (47), a pressurizing portion for transporting the different fluid substances is a group of pressurizing portions which move independently.

(50) In the mechanism for driving a chemical reaction cartridge according to the paragraph (48) or (49), the group of pressurizing portions move in at least two different directions in a surface of the vessel.

(51) In the mechanism for driving a chemical reaction cartridge according to the paragraph (50), the two directions are perpendicular to each other.

(52) In the chemical reaction cartridge according to the paragraph (46), a direction of movement of the pressurizing portion to which the external force is applied and a direction of the flow path are different from each other in a surface of the vessel.

(53) In the chemical reaction cartridge according to the paragraph (47), a direction of movement of the pressurizing portion to which the external force is applied and a direction of the flow path are different from each other in a surface of the vessel.

(54) In the chemical reaction cartridge according to the paragraph (52) or (53), the direction of the flow path is at an angle of 90 degrees or lower with respect to the direction of the movement of the pressurizing portion.

(55) In the chemical reaction cartridge according to the paragraph (46), a rigid body is formed on the vessel side of the flow path, and an external force is applied on a part of the flow path so that a rigid body forming portion blocks the flow path entirely.

(56) In the chemical reaction cartridge according to the paragraph (47), a rigid body is formed on the vessel side of the flow path, and an external force is applied on a part of the flow path so that a rigid body forming portion blocks the flow path entirely.

(57) In the chemical reaction cartridge according to the paragraph (52), a rigid body is formed on the vessel side of the flow path, and an external force is applied on a part of the flow path so that a rigid body forming portion blocks the flow path entirely.

(58) In the chemical reaction cartridge according to the paragraph (53), a rigid body is formed on the vessel side of the flow path, and an external force is applied on part of the flow path so that a rigid body forming portion blocks the flow path entirely.

(59) In the chemical reaction cartridge according to the paragraph (21), a trap material for trapping a predetermined substance is permanently or temporarily fixed into the common chamber.

(60) In the chemical reaction cartridge according to the paragraph (59), the predetermined substance is a biopolymer.

(61) In the chemical reaction cartridge according to the paragraph (60), the biopolymer is DNA, RNA, protein, metabolite or sugar chain.

(62) In the chemical reaction cartridge according to the paragraph (59), the trap material is provided as beads, a filter, a fiber or a column having a surface modified for trapping.

(63) In the chemical reaction cartridge according to the paragraph (62), the beads are silica, magnetic beads, metal beads or resin beads.

(64) The invention provides a mechanism for driving a chemical reaction cartridge having a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein the external force is generated by pressing a two-dimensional plate from one direction of the elastic body side.

(65) In the mechanism for driving a chemical reaction cartridge defined in the paragraph (1) or (2), the external force is generated by pressing a two-dimensional plate from one direction of the elastic body side.

(66) In the mechanism for driving a chemical reaction cartridge according to the paragraph (64), the two-dimensional plate has a curvature in a surface thereof which applies the external force on the flow path or the chambers.

(67) In the mechanism for driving a chemical reaction cartridge according to the paragraph (65), the two-dimensional plate has a curvature in a surface thereof which applies the external force on the flow path or the chambers.

(68) The invention provides a mechanism for driving a chemical reaction cartridge having a vessel having at least one part made of an elastic body, wherein a plurality of chambers formed in the vessel so as to be connected or arranged connectably through a flow path, and an external force is applied to the elastic body from an outside of the vessel to move a fluid substance in the flow path or the chambers or in both the flow path and the chambers so as to perform a chemical reaction, wherein the mechanism has: a plurality of pressing portions which press the chemical reaction cartridge; and a base portion provided with the pressing portions.

(69) In the mechanism for driving a chemical reaction cartridge according to the paragraph (68), the plurality of chambers are arranged at regular intervals of a pitch, and the pressing portions are arranged at regular intervals of a pitch equal to the pitch of the chambers.

(70) In the mechanism for driving a chemical reaction cartridge according to the paragraph (68) or (69), the base portion has an opening portion into which an actuator is inserted.

(71) The mechanism for driving a chemical reaction cartridge according to the paragraph (68) or (69), further has a shutter which blocks the fluid substance moving in a direction perpendicular to a direction of the movement of the pressing portions.

(72) In the mechanism for driving a chemical reaction cartridge according to the paragraph (68) or (69), the pressing portions include: a plurality of rollers which press the chemical reaction cartridge; and a plurality of roller support portions which support the rollers respectively.

(73) In the mechanism for driving a chemical reaction cartridge according to the paragraph (72), each of the roller support portions has a groove into which one of the rollers is inserted, and the groove holds the roller to wrap the roller at a higher angle than 180°.

(74) In the mechanism for driving a chemical reaction cartridge according to the paragraph (72), each of the roller support portions has a roller stopper member in its side surface.

(75) In the mechanism for driving a chemical reaction cartridge according to the paragraph (68) or (69), each of the pressing portions has an end portion having a curved surface for pressing the chemical reaction cartridge.

(76) In the mechanism for driving a chemical reaction cartridge according to the paragraph (75), the curved surface is a circular curved surface or a non-circular curved surface.

(77) The mechanism for driving a chemical reaction cartridge according to the paragraph (75), further has a member which is provided between the chemical reaction cartridge and the pressing portions and which reduces friction.

According to the chemical reaction cartridge and the method of producing the chemical reaction cartridge described in the paragraphs (1) to (8), since the air-release path for releasing air from the chambers are provided in the chambers into which the fluid substance flows, the fluid substance is prevented from returning by the back pressure of the air pushed out and are prevented from involving air. Moreover, since either of the flow path and the chambers has a zero volume structure, the same effect as described above can be achieved.

According to the chemical reaction cartridge and the mechanism for driving the chemical reaction cartridge described in the paragraphs (9) to (24), since the pressurizing portions are provided for simultaneously blocking all input and output flow paths of a chamber holding a fluid substance, the fluid substance can be prevented from flowing into a next chamber and a chamber after the next chamber at the time of transporting the fluid substance. Moreover, the fluid substance can be prevented from flowing out to other chambers at the time of heating or vibrating the fluid substance.

According to the chemical reaction cartridge described in the paragraphs (25) to (28), since air in the fluid substance can be released from the entrance, the fluid substance can be prevented from being mixed with air at the time of injecting a sample. Moreover, a predetermined amount of the sample can be transported into the cartridge.

According to the chemical reaction cartridge and the mechanism for driving the chemical reaction cartridge described in the paragraphs (29) to (63), since at least one of the chambers is a common chamber having the inlet flow paths through which two or more kinds of different fluid substances flow into the common chamber, and at least two outlet flow paths, and when one of the fluid substances flows into or from the common chamber, the flow paths into to or from which the other fluid substance flows are blocked by the external force so that different fluids can cross one another in the common chamber. Accordingly, a step of extracting or purifying a predetermined substance from a sample can be achieved.

According to the mechanism for driving the chemical reaction cartridge described in the paragraphs (64) to (67), the two-dimensional plate having a curvature in its surface touching the vessel is used so that the plate is moved while pressing the vessel. Accordingly, since the flow path and chambers are pressed by a surface, the solutions and air can be prevented from moving back by back pressure.

According to the mechanism for driving the chemical reaction cartridge described in the paragraphs (68) and (69), since all input and output flow paths of a chamber holding a fluid substance are simultaneously blocked by the pressing portions of the cartridge driving mechanism, the fluid substance can be prevented from flowing into a next chamber and a chamber after the next chamber at the time of transporting the fluid substance. Moreover, the fluid substance can be prevented from flowing out to other chambers at the time of heating or vibrating the fluid substance. Further, the solutions are not pushed back due to back pressure of the air. In addition, a structure (cross structure) for extraction and purification of DNA from a sample by using silica, magnetic particles or the like can be achieved.

According to the mechanism for driving the chemical reaction cartridge described in the paragraph (70), the actuator can be inserted, and vibration, heating, etc. can be applied.

According to the mechanism for driving the chemical reaction cartridge described in the paragraph (71), fluid substances moving in a direction perpendicular to the direction of the movement of the pressing portions can be blocked by the shutter.

According to the mechanism for driving the chemical reaction cartridge described in the paragraphs (72) to (77), since the rollers are provided in the pressing portions or ends of the pressing portions are provided as curved surfaces, friction between the cartridge and the pressing portions can be reduced. When the ends of the pressing portions are provided as cured surfaces, the curved surfaces may be provided as circular or non-circular curved surfaces suitable for the material of the cartridge. A sheet made of a friction reducing member may be provided between the cartridge and the curved surfaces or the surface of the cartridge may be coated with the same member to smoothen the movement of the pressing portions.

BRIEF DESCRIPTION OF THE DRAWINGS

FIG. 2 is an explanatory view for explaining solution transport and air release in the invention;

DETAILED DESCRIPTION OF THE PREFERRED EMBODIMENTS

Figure 1A:
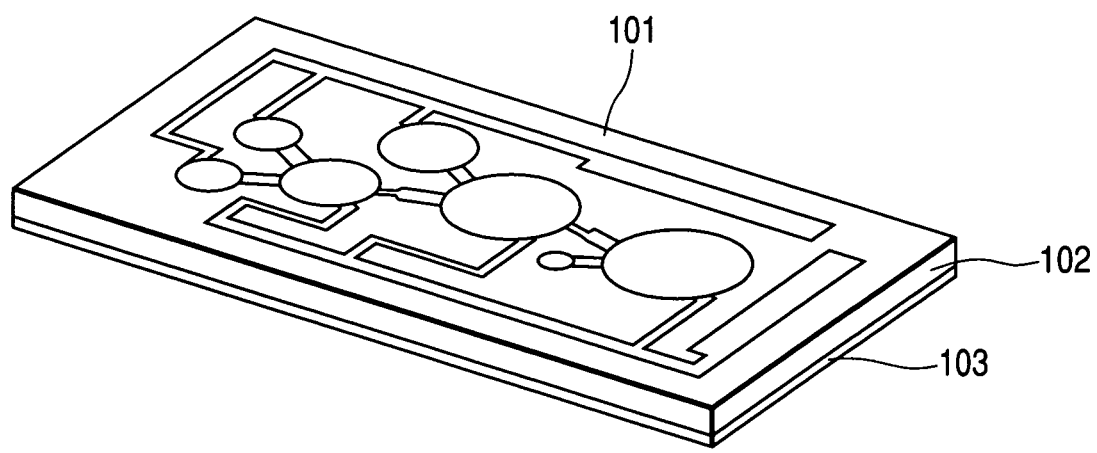
FIGS. 1A and 1B are external appearance views showing an embodiment of a chemical reaction cartridge according to the invention.
Figure 1B:
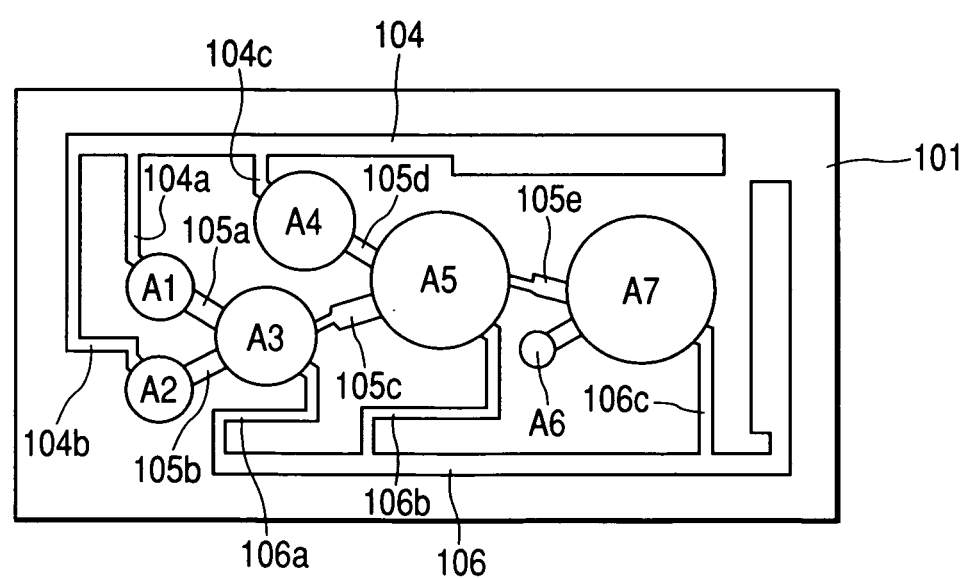

The invention will be described below in detail with reference to the drawings. FIGS. 1A and 1B are views showing the external appearance of an embodiment of a chemical reaction cartridge according to the invention.

FIG. 1A is a perspective view of the cartridge. FIG. 1B is a plan view of the cartridge. The cartridge 101 has an elastic body 102 such as airtight elastic rubber, and a flat substrate 103 made of a rigid material. Incidentally, a viscoelastic body or a plastic body may be used as the elastic body 102 of the cartridge. This embodiment will be described on the case where use of an elastic body is taken as an example.

Examples of the material of the substrate 103 may include glass, metal, rigid resin, and elastic body. The elastic body 102 and the substrate 103 may be bonded to each other by adhesion or by other means such as suction (e.g. between PDMS (PolyDiMethylSiloxane) and glass), ultrasonic treatment, heating, plasma adhesive treatment or vibrational welding.

Wells A1 to A7, flow paths 105a to 105f, air-intake paths 104a to 104c, a common air-intake path 104, air-release paths 106a to 106c and a common air-release path 106 are formed in the rear surface of the elastic body 102 so as to become hollow toward the upper surface of the elastic body 102. Regions corresponding to the wells and paths rise convexly toward the upper surface of the elastic body 102. The wells A1 to A7 are holes in which a solution is reserved. The flow paths 105a to 105f connect the wells to one another. Air is supplied into the wells A1, A2 and A4 through the air-intake paths 104a to 104c. The air-intake paths 104a to 104c are connected to the common air-intake path 104. Air is released from the wells A3, A5 and A7 through the air-release paths 106a to 106c. The air-release paths 106a to 106c are connected to the common air-release path 106. A flat portion of the rear surface of the elastic body 102 other than the wells, flow paths, air-intake paths and air-release paths is bonded to the front surface of the substrate 103. As a result, the wells, flow paths, air-intake paths and air-release paths are sealed hermetically with the elastic body 102 and the substrate 103 to thereby form such a structure that the solution can be prevented from leaking out.

A solution transporting operation of the cartridge formed thus will be described below.

FIG. 2 is an explanatory view for explaining transportation of the solution and release of air in the invention. In FIG. 2, wells B1 and B2 are connected to each other by a flow path 107a. The aperture areas of flow paths 107a and 107b near the outlets of the wells B1 and B2 are made narrower than those of air-release paths 108a and 108b to thereby form restrictors (e.g. the aperture area of the flow path 107a or 107b is equal to a value in a range of from 1/3 to 1/5 as large as the aperture area of the air-release path 108a or 108b). As a result, resistance against release of air to the flow paths 107a and 107b increases, so that air flows out into the air-release paths 108a and 108b. Specifically, the cartridge operates as follows.

A roller 109 presses the cartridge from above so that the concave portion of the front surface of the cartridge is squashed. When the roller 109 in this state is rotated and moved right in the direction of the solid-line arrow, the solution in the well B1 is pushed out to the right. As a result, the solution flows into the well B2 through the flow path 107a. On this occasion, air 110 in the well B2 is pressed by the solution flowing into the well B2, so that the air 110 is released from the well B2 through the air-release path 108b as represented by the broken-line arrow.

Since the solution supply side air-release path 108a is blocked with the roller 109, the solution is not leaked to the air-release path side but the remaining solution in the air-release path 108a is transported to the well B2 in accordance with the movement of the roller 109. As a result, the cartridge can be provided so that the solution pushed out can be prevented from being returned by the back pressure of air, and that air can be prevented from being mixed with the solution.

FIGS. 3A to 3D are explanatory views showing another embodiment of a chemical reaction cartridge (zero volume structure) according to the invention.

Figure 3A:
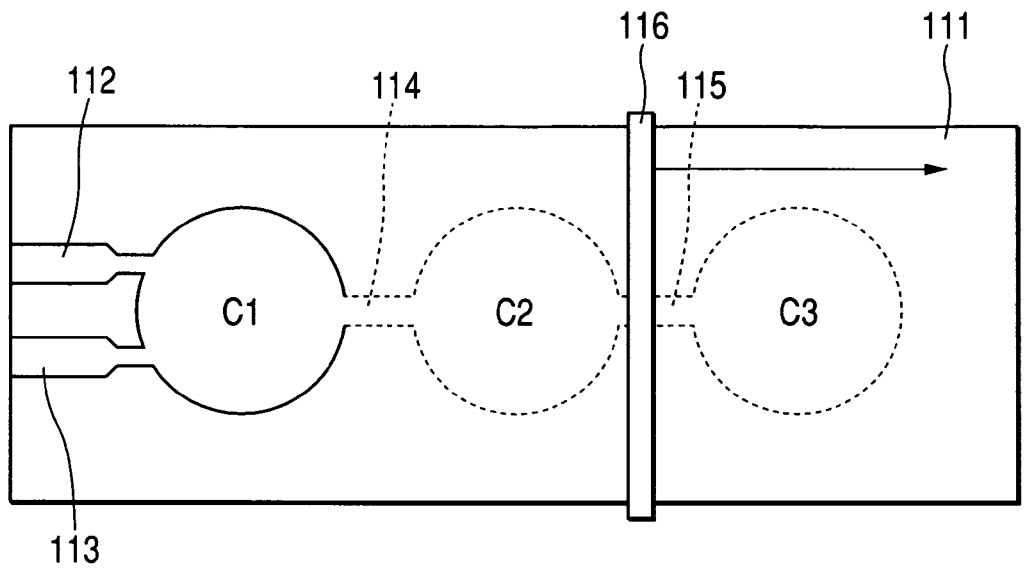
FIGS. 3A to 3D are explanatory views showing another embodiment (zero volume structure) of the chemical reaction cartridge according to the invention.
Figure 3B:
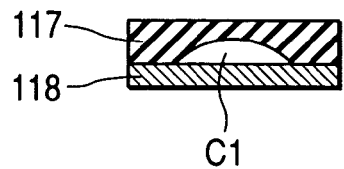

FIG. 3A is a plan view of the cartridge. As shown in FIG. 3B, the cartridge 111 has an elastic body 117 having airtightness and elasticity, and a flat substrate 118, in the same manner as the previous embodiment. For example, the elastic body 117 and the substrate 118 can be produced from PDMS (PolyDimethylSiloxane). A well C1 and flow paths 112 and 113 are provided in the rear surface of the elastic body 117. The well C1 is a hole in which the solution is reserved. The solution flows into the well C1 through the flow paths 112 and 113.

Besides the well C1, wells C2 and C3 are provided. The well C2 is connected to the well C1 through a flow path 114. The well C3 is connected to the well C2 through a flow path 115. In the region of each of the flow paths 114 and 115 and the wells C2 and C3, the elastic body 117 and the substrate 118 are not adhesively bonded but brought into contact with each other so that the volume of the region becomes zero before the solution flows into the region or after the solution passes through the region. As a result, removal of air becomes needless because there is no air in each of the flow paths and the wells.

The well C1 and the flow paths 112 and 113 represented by the solid line in FIG. 3A are visible because they rise convexly to the surface of the cartridge 111. On the contrary, the flow paths 114 and 115 and the wells C2 and C3 represented by the broken line in FIG. 3A are invisible.

To transport the solution, the cartridge operates as follows.

Figure 3C:
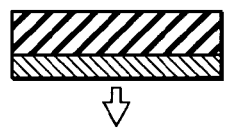

As shown in FIG. 3A, the roller 116 presses the cartridge 111 from above so that the front surface (the flow paths 112 and 113 and the well C1) of the cartridge 111 is squashed. When the roller 116 is rotated and moved right in the direction of the arrow, the solution reserved in the well C1 moves so as to flow into the well C2 through the flow path 114. As shown in FIG. 3C, the flow path 114 and the well C2 which have exhibited zero volume are changed to a solution path (flow path 114) and a reservoir (well C2) on this occasion because the elastic body 117 in a portion of each of the flow path 114 and the well C2 facing on the substrate 118 is pushed up by the inflow of the solution. After the solution passes through each of the flow path 114 and the well C2, the volume of each of the flow path 114 and the well C2 becomes zero because of the restoring force of the elastic body 117.

Figure 3D:
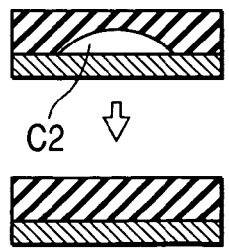

As shown in FIG. 3D, the flow path 115 and the well C3 operate in the same manner as described above so that the solution flows from the well C2 into the well C3 through the flow path 115 in accordance with the movement of the roller 116. Before the inflow of the solution, the volume of each of the flow path 115 and the well C3 is zero. A solution path (flow path 115) and a reservoir (well C3) are formed in accordance with the inflow of the solution. Such a structure can be formed because the vessel is made of the elastic body 117.

An embodiment of a method for producing a cartridge having such a zero volume structure will be described below.

Figure 4A:
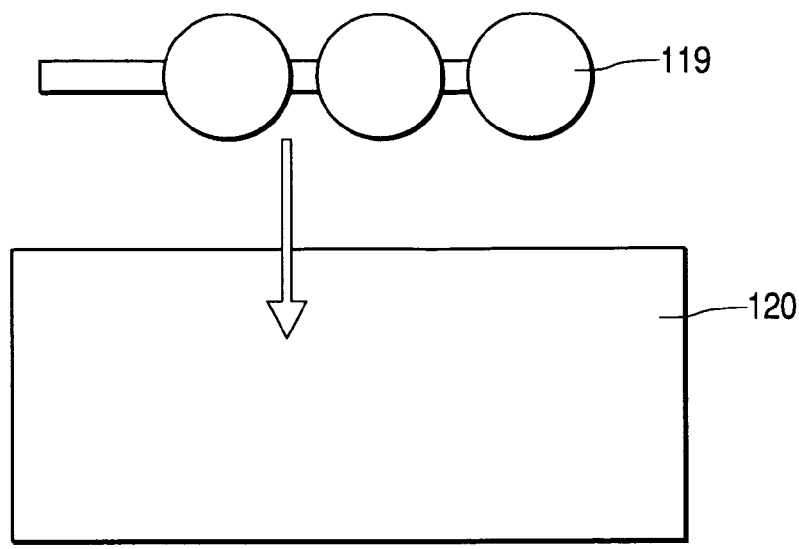
FIGS. 4A to 4C are explanatory views for explaining a first embodiment of a method for producing a chemical reaction cartridge.
Figure 4B:
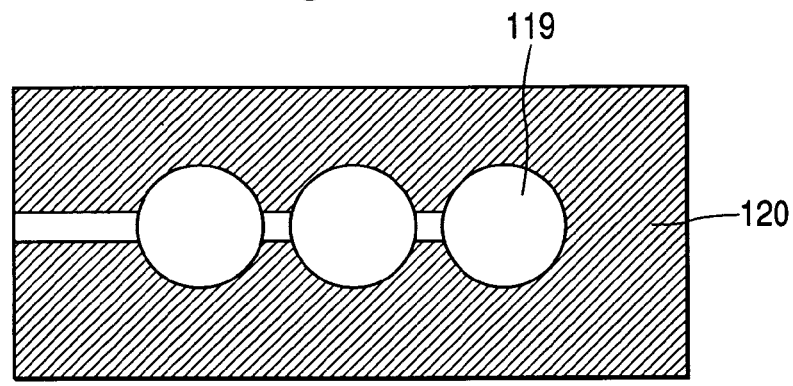
Figure 4C:
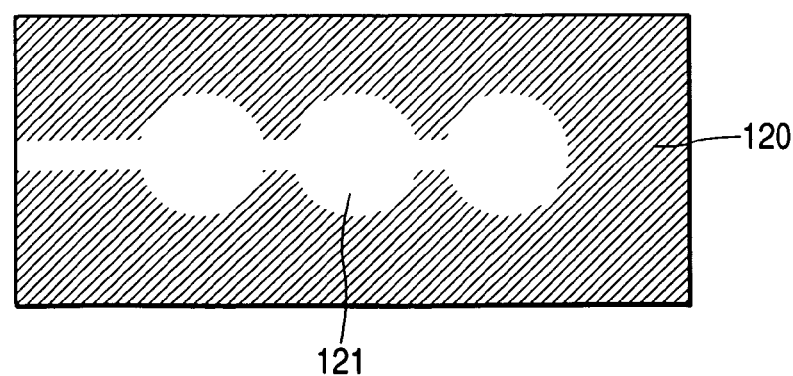

FIGS. 4A to 4C are explanatory views for explaining a first embodiment of a method for producing a cartridge. The steps of the method for producing a cartridge will be described below with reference to FIGS. 4A to 4C.

(1) A mask 119 and a substrate 120 are prepared (FIG. 4A).

(2) The mask 119 is placed on the substrate 120 and plasma adhesive treatment is performed (FIG. 4B). As a result, the portion (hatched portion) of the substrate 120 except the mask 119 is plasma-treated so as to be adhesive (FIG. 4C).

(3) The mask 119 is removed and the substrate 120 is bonded to an elastic body not shown. Incidentally, a substance not activated by plasma may be used in place of the mask 119 so that the substance is applied on the non-adhesive portion 121 of the substrate 120 before the plasma adhesive treatment.

The plasma adhesive treatment concerned with PDMS is a known technique (e.g. see Plasma Materials Science Handbook, Ohmsha, Ltd., 1992) and the description thereof will be omitted.

Figure 5A:
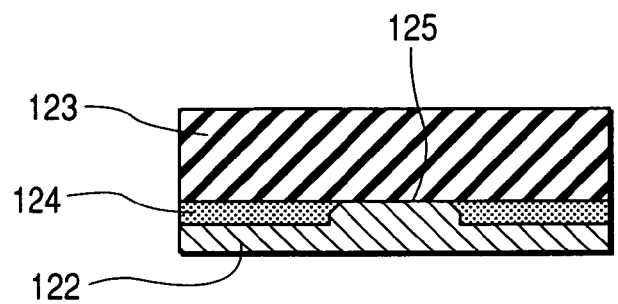
FIGS. 5A and 5B are explanatory views for explaining a second embodiment of the method for producing a chemical reaction cartridge.
Figure 5B:
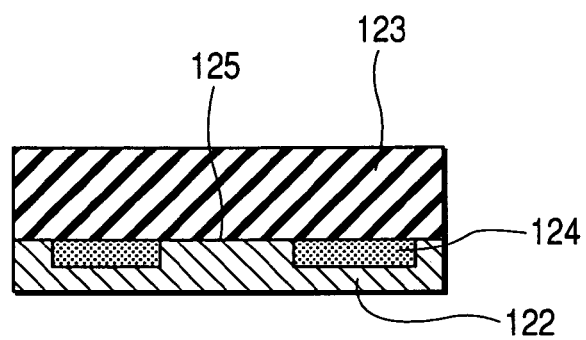

FIGS. 5A and 5B are explanatory views for explaining a second embodiment of a method for producing a chemical reaction cartridge. The steps of the method for producing a cartridge will be described below with reference to FIGS. 5A and 5B.

(1) A notch is provided around a non-adhesive portion 125 of a substrate 122 and an adhesive agent 124 is applied so that the notch is filled with the adhesive agent 124. The notch may be formed in such a manner that the portion except the non-adhesive portion is cut off as shown in FIG. 5A or in such a manner that a groove is formed around the non-adhesive portion as shown in FIG. 5B.

(2) The substrate 122 is bonded to an elastic body 123.

Incidentally, the notch in the substrate 122 is provided for preventing the adhesive agent 124 from flowing into the non-adhesive portion. If a non-adhesive substance is applied on the non-adhesive portion 125 before bonding, it is unnecessary to provide the notch in the substrate 122.

Figure 6:
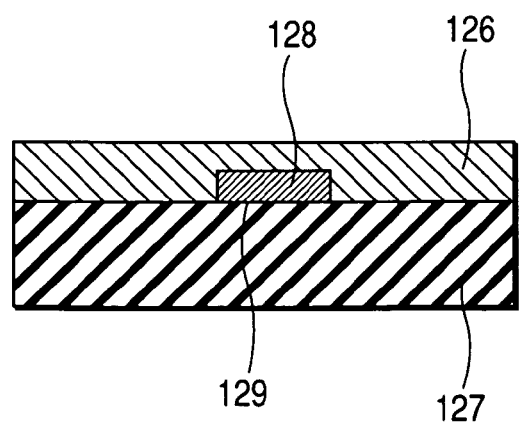
FIG. 6 is an explanatory view for explaining a third embodiment of the method for producing a chemical reaction cartridge.

FIG. 6 is an explanatory view for explaining a third embodiment of a method for producing a chemical reaction cartridge. The steps of the method for producing a cartridge will be described with reference to FIG. 6.

(1) An implantable material 128 having a non-adhesive surface is placed on a non-adhesive portion 129 of an elastic body 127.

(2) A raw material of a substrate 126 is poured onto the elastic body 127 from above and hardened (e.g. casting molding).

As a result, the elastic body 127 and the substrate 126 are bonded to each other except the implantable material 128. Incidentally, for example, the implantable material 128 can be made from PDMS.

The configuration of a chemical reaction cartridge and a driving mechanism for transporting a solution in the cartridge will be described below.

Figure 7A:
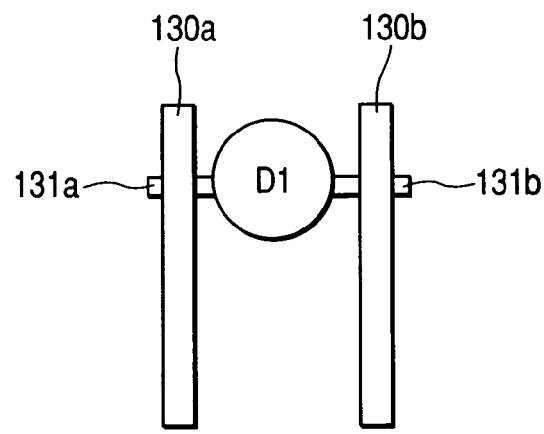
FIGS. 7A to 7C are explanatory views showing a first embodiment concerned with a chemical cartridge and a driving mechanism.
Figure 7B:
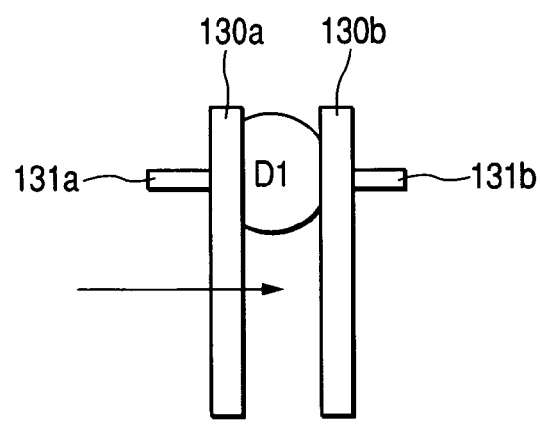
Figure 7C:
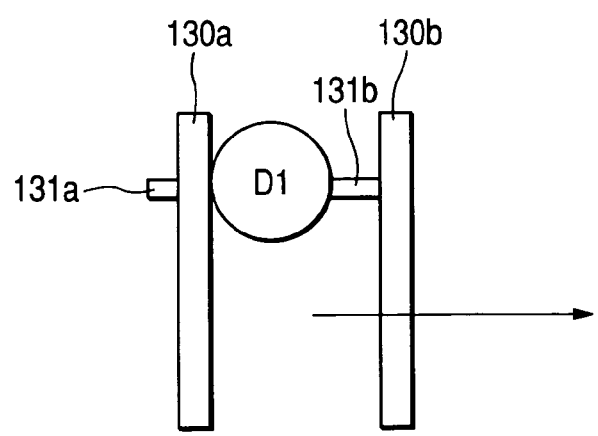

FIGS. 7A to 7C are explanatory views showing a first embodiment concerned with the chemical reaction cartridge and the driving mechanism.

In FIG. 7A, a roller 130a is pressed against the cartridge to block a flow path 131a which is an inlet through which a solution enters a well D1. A roller 130b blocks a flow path 131b which is an outlet. When all the inlet and outlet of the well are blocked with a plurality of rollers simultaneously in this manner, the solution can be prevented from flowing into the next well and flow paths and wells beyond the next well when the solution is transported.

As shown in FIG. 7B, a neighbor of the solution outlet of the well D1 is blocked by the roller 130b and the roller 130b is locked so that the roller 130b cannot move. When the roller 130a in this state is rotated and moved in the direction of the arrow so that the well D1 is sandwiched between the rollers 130a and 130b, the solution in the well D1 can be pressurized.

As shown in FIG. 7C, a neighbor of the solution inlet of the well D1 is blocked by the roller 130a and the roller 130a is locked so that the roller 130a cannot move. When the roller 130b is rotated and moved in the direction of the arrow so as to depart from the well D1, the pressure of the solution in the well D1 can be reduced.

FIGS. 8A to 8D are explanatory views showing a second embodiment concerned with the chemical reaction cartridge and the driving mechanism.

Figure 8A:
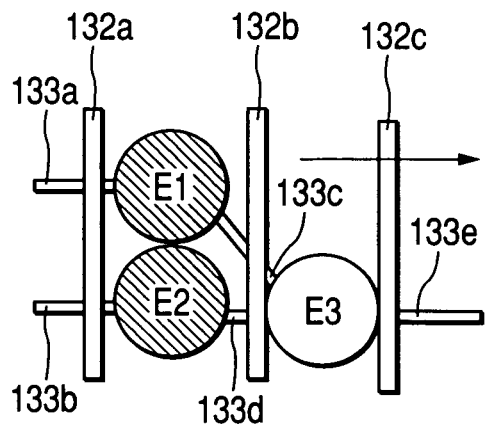
FIGS. 8A to 8D are explanatory views showing a second embodiment concerned with the chemical cartridge and the driving mechanism.
Figure 8B:
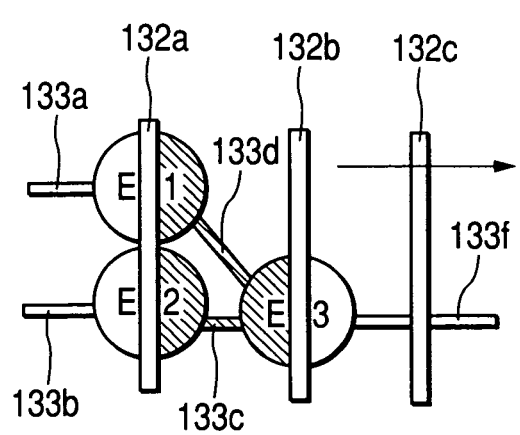
Figure 8C:
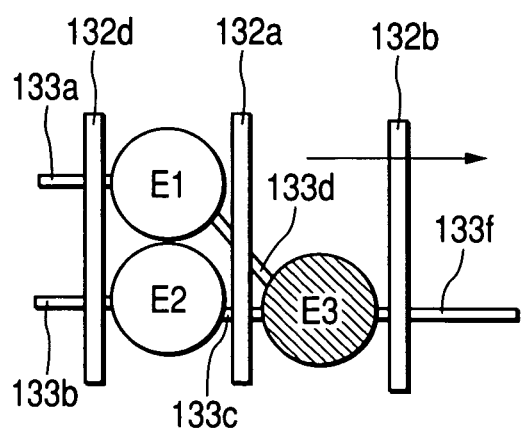

FIGS. 8A, 8B and 8C show change in state in accordance with the movement of rollers 132a, 132b and 132c in the direction of the arrow. The hatched portion expresses the presence of a solution. Although this embodiment shows the case where a zero volume structure is used as a well structure, a structure in which air-release paths are provided may be used.

In FIG. 8A, flow paths 133a and 133b which are solution inlets are provided in wells E1 and E2 respectively. The well E1 is connected to a well E3 by a flow path 133c. The well E2 is connected to the well E3 by a flow path 133d. A flow path 133e which is a solution outlet is provided in the well E3. The wells E1 and E2 are aligned with each other so that solutions can be transported simultaneously by one roller.

The roller 132a blocks the flow paths 133a and 133b. The roller 132b blocks the flow paths 133c and 133d. As a result, the solutions in the wells E1 and E2 can be prevented from flowing into the well E3.

FIG. 8B shows a state in which the rollers 132a, 132b and 132c are moved so that the roller 132a is located on the wells E1 and E2 while the roller 132b is located on the well E3. The solutions in the wells E1 and E2 are pushed out by the roller 132a so as to be located in the wells and flow paths between the rollers 132a and 132b as represented by the hatched portion.

FIG. 8C shows a state in which the rollers 132a, 132b and 132c (132c not shown) are further moved so that the roller 132a is located on the flow paths 133c and 133d while the roller 132b is located on the flow path 133e. All the solutions in the wells E1 and E2 are pushed out by the roller 132a so as to be moved into the well E3 as represented by the hatched portion.

The solution in the well E3 is prevented from flowing back because the roller 132a blocks the flow paths 133c and 133d. At the same time, the solution in the well E3 is prevented from flowing into the next well not shown because the roller 132b blocks the flow path 133e.

Since such a structure that the solution inlet and outlet of each well are blocked is used, the outflow of the solution from the well can be prevented even in the case where heat or vibration from the outside of the cartridge is applied to the solution stored in the well.

Although this embodiment shows the case where solutions in two wells are moved into one well and mixed with each other in the well, it is a matter of course that the invention may be applied to the case where a solution is transported from one well to another well or to the case where two or more wells containing solutions to be mixed are provided so that two or more kinds of solutions can be mixed.

Figure 8D:
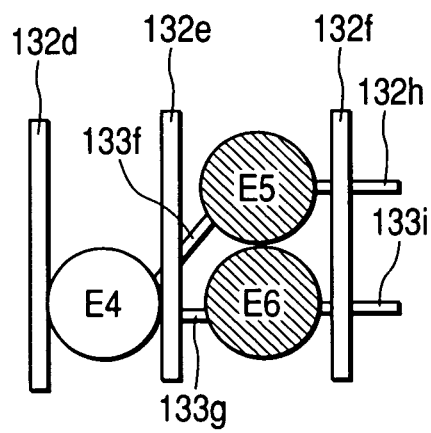

The invention can be applied to the case where a solution in one well is distributed into two wells as shown in FIG. 8D. In FIG. 8D, the operations of the respective rollers are the same as those shown in FIGS. 8A to 8C.

In FIG. 8D, a solution in a well E4 is pushed out by the movement of a roller 132e and distributed into wells E5 and E6 through flow paths 133f and 133g. Since the flow paths 133f and 133g are blocked by the roller 132e while flow paths 133h and 133i are blocked by a roller 132f, solutions are prevented from flowing out of the wells E5 and E6.

Although this embodiment shows the case where the outflow of solutions is blocked by a roller moving in parallel with the front surface of the cartridge, a blocking means such as a shutter moving in a direction perpendicular to the front surface of the cartridge to block flow paths may be used.

FIGS. 9A to 9E are explanatory views showing a third embodiment concerned with the chemical reaction cartridge and the driving mechanism. This embodiment will be described on the case where extraction of a biopolymer such as DNA (deoxyribonucleic acid), RNA (ribonucleic acid), protein or sugar chain is taken as an example.

In FIGS. 9A to 9E, wells F1 to F13 are provided in the cartridge. The wells F6 to F8 are connected to the well F9 which serves as a common well. The wells F6 to F8 are arranged in a column on a left side of the well F9. The wells F1 and F2 are connected to the well F6 which serves as a common well. The wells F1 and F2 are arranged in a column on a left side of the well F6. The wells F3 and F5 are arranged in the same column in which the wells F1 and F2 are arranged. The well F3 is connected to the well F7. The well F5 is connected to the well F8. The well F4 is connected to the well F5 so as to be located in the left of the well F5.

The well F10 is connected to the well F9 so as to be located in the right of the well F9. The wells F11 to F13 are arranged in a row so as to be cascaded to the well F10.

These wells are arranged at regular intervals of a pitch in the lateral direction (the direction of the movement of rollers). Rollers (as designated by the reference numerals 134a, 134b and 134c for convenience' sake) are arranged at regular intervals of the same lateral pitch as that of the wells.

Incidentally, like well patterns indicate like contents. Although this embodiment shows the case where a zero volume structure is used as a well structure, a structure in which air-release paths are provided may be used. Although this embodiment shows the case where rollers are used as the pressurizing portion, piston type actuators may be used.

Figure 9A:
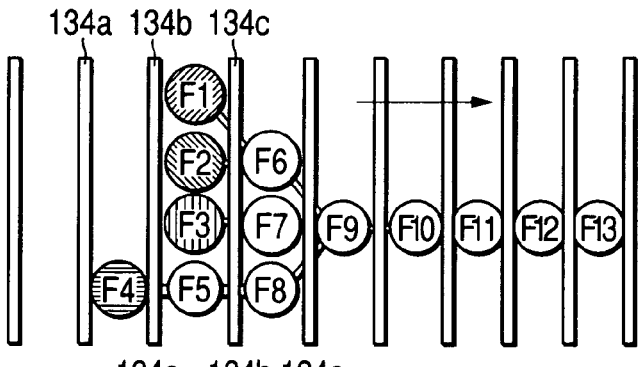
FIGS. 9A to 9E are explanatory views showing a third embodiment concerned with the chemical cartridge and the driving mechanism.

FIG. 9A shows a state in which the rollers are set so as to be aligned with inlets and outlets of the wells. A sample solution is contained in the well F1 in advance. A lytic solution is contained in the well F2 in advance. A DNA trap material (surface-modified magnetic particles) is contained in the well F3 in advance. A cleaning solution is contained in the well F4 in advance. The other wells are in a zero volume state.

Each roller rotates and moves in the direction of the solid-line arrow. The rollers 134a, 134b and 134c press the inlets and outlets of the wells F1 to F5 to thereby prevent the fluids such as the sample solution from flowing out.

Figure 9B:
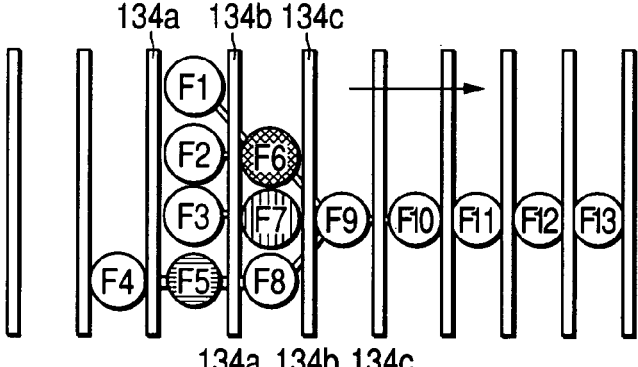

FIG. 9B shows a state in which the respective rollers are rotates and moved by a one-well's distance in the direction of the arrow. Accordingly, the sample solution in the well F1 and the lytic solution in the well F2 are mixed with each other in the well F6 while the trap material in the well F3 is moved into the well F7 in accordance with the movement of the roller 134b.

The cleaning solution in the well F4 is moved into the well F5 in accordance with the movement of the roller 134a. The wells F7, F5 and F8 are originally empty wells and serve as dummy wells for adjusting the timing of transporting the trap material and the cleaning solution into the well F9. The presence of the wells F7, F5 and F8 makes it possible to transport a target solution into a target well at arbitrary timing in accordance with the movement of rollers only on one axis.

In the well F6, the step of heating the mixture solution to perform a reaction is carried out. For example, a Peltier element is used for heating the mixture solution.

Incidentally, the volume of each dummy well is set so as to be equal to that of a well in which a solution etc. is held initially.

Figure 9C:
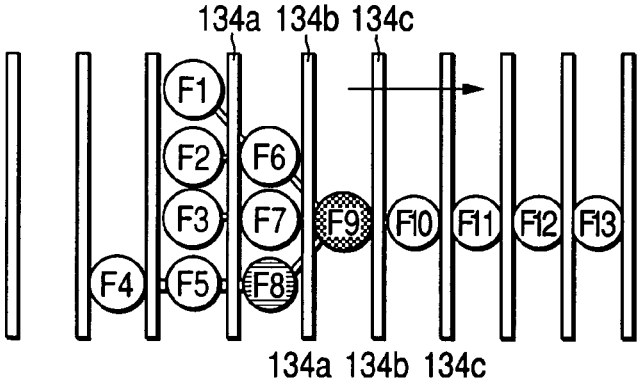

FIG. 9C is a state in which the respective rollers in a state shown in FIG. 9B are rotated and moved by a one-well's distance in the direction of the arrow. Accordingly, the mixture solution in the well F6 and the DNA trap material in the well F7 are mixed with each other in the well F9 in accordance with the movement of the roller 134b. The cleaning solution in the well F5 is moved into the well F8 in accordance with the movement of the roller 134a.

In the well F9, DNA is trapped in the DNA trap material while magnetic particles as the trap material per se are trapped in the well F9 in accordance with application of a magnetic field.

Figure 9D:
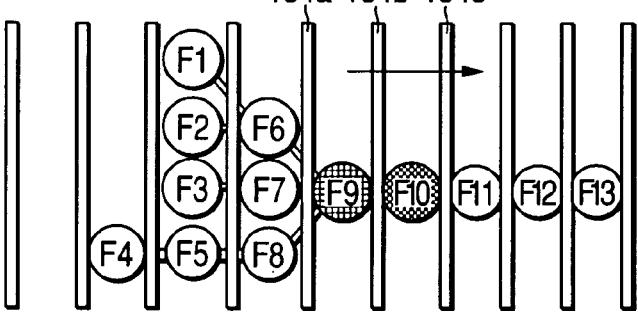

FIG. 9D is a state in which the respective rollers in a state shown in FIG. 9C are rotated and moved by a one-well's distance in the direction of the arrow. Accordingly, the waste after DNA trapping in the well F9 is moved into the well F10 in accordance with the movement of the roller 134b. The cleaning solution in the well F8 is moved into the well F9 in accordance with the movement of the roller 134a. In the well F9, the magnetic particles are cleaned with the cleaning solution.

Figure 9E:
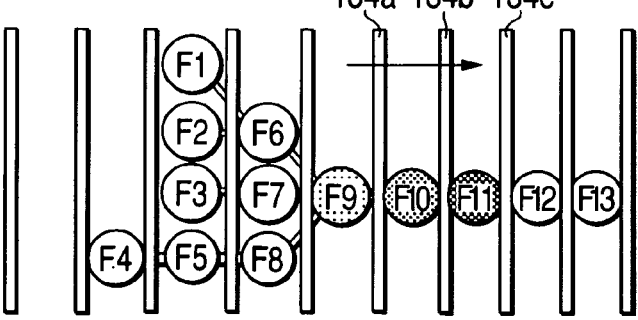

FIG. 9E shows a state in which the respective rollers in a state shown in FIG. 9D are rotated and moved by a one-well's distance in the direction of the arrow. Accordingly, the waste in the well F10 is moved into the well F11 in accordance with the movement of the roller 134b. The cleaning solution after cleaning of the well F9 is moved into the well F10 in accordance with the movement of the roller 134a.

As described above, DNA trapped in the magnetic particles is accumulated in the well F9, so that DNA can be extracted.

Incidentally, beads, a filter, a column, etc. can be used for trapping DNA. Examples of beads include silica, magnetic beads, metal beads, and resin beads.

The aforementioned solution transport mechanism is similar to the motion of a shift register of a digital circuit. Such a solution transport structure can be called "clock type solution transport structure". The point of difference from an electric system is in that flow paths are provided independently because it is necessary to prevent the lytic solution from being contaminated (mixed) with the cleaning solution.

Figure 10A:
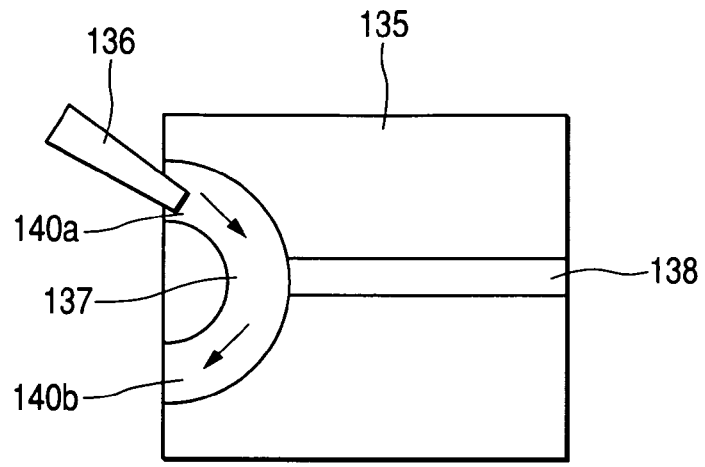
FIGS. 10A to 10C are explanatory views showing a fourth embodiment concerned with the chemical cartridge and the driving mechanism.
Figure 10B:
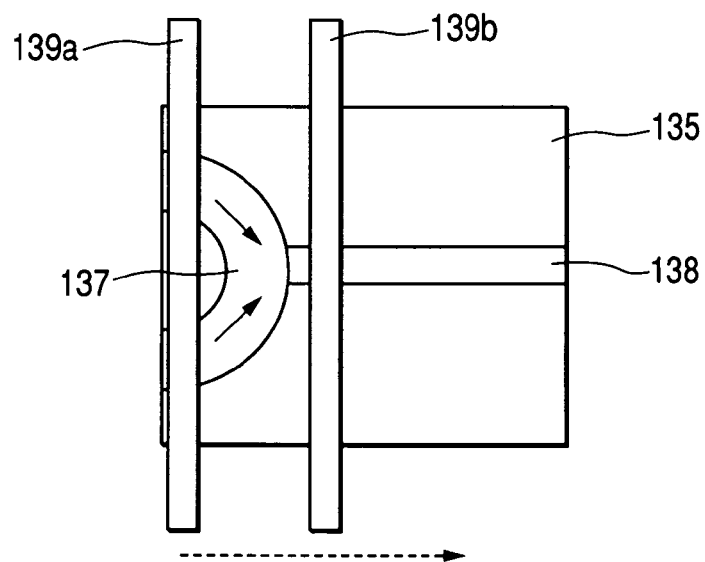
Figure 10C:
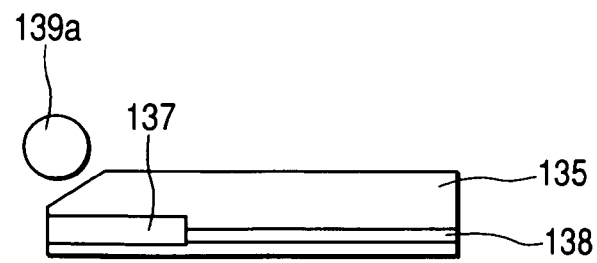

FIGS. 10A to 10C are explanatory views showing a fourth embodiment concerned with the chemical reaction cartridge and the driving mechanism.

FIGS. 10A to 10C show an entrance of a cartridge 135 through which a solution is introduced. In FIG. 10A, the entrance 137 is provided as a U-shaped passage for leading the solution from the outside of the cartridge 135 to the inside of the cartridge and leading the solution from the inside of the cartridge to the outside of the vessel. The U-shaped entrance 137 is connected to a flow path 138 for treatment in the inside of the cartridge 135. The entrance 137 has a predetermined volume regardless of whether the solution is present or absent. The flow path 138 has a zero volume structure as described above.

A solution is injected into an injection portion 140a by an injector 136. The injector portion 140a is on one side of the entrance 137. Air initially present in the entrance 137 is pushed out by the solution so that the air is released out from the other injection portion 140b as represented by the solid-line arrow.

Then, as shown in FIG. 10B, rollers 139a and 139b are pressed against the cartridge 135 from above so that the injection portions 140a and 140b are blocked simultaneously by the roller 139a while the flow path 138 is blocked by the roller 139b. The two rollers are rotated and moved in the direction of the broken-line arrow so that the solution in the entrance 137 is pushed out into the flow path 138 as represented by the solid-like arrow.

In this manner, the solution can be prevented from being mixed with air. Moreover, a predetermined quantity of the solution in the U-shaped portion can be transported into the cartridge.

In addition, the cartridge surface of the entrance 137 may be tapered toward each injection portion as shown in FIG. 10C. In this case, the entrance 137 can be blocked by the roller 139a easily, so that the solution can be prevented from being mixed with air.

Figure 11A:
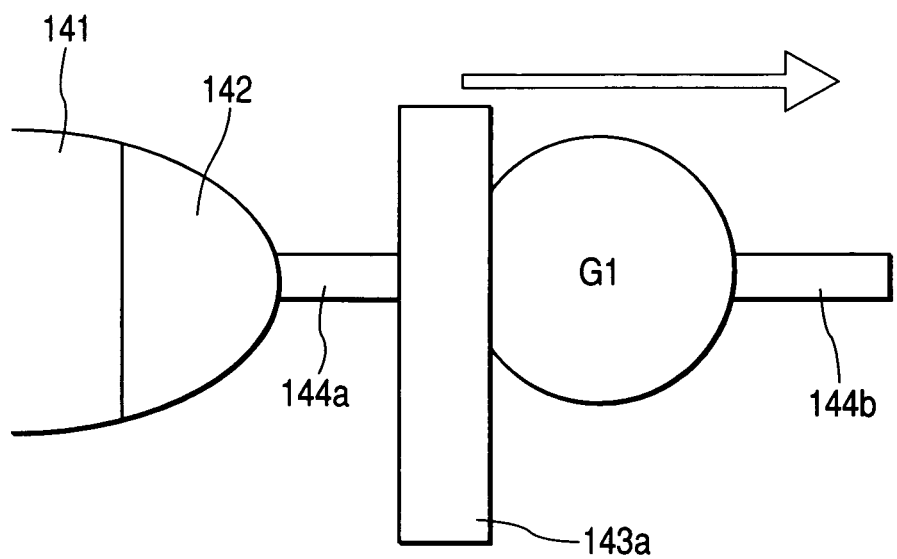
FIGS. 11A and 11B are explanatory views showing a fifth embodiment concerned with the chemical cartridge and the driving mechanism.
Figure 11B:
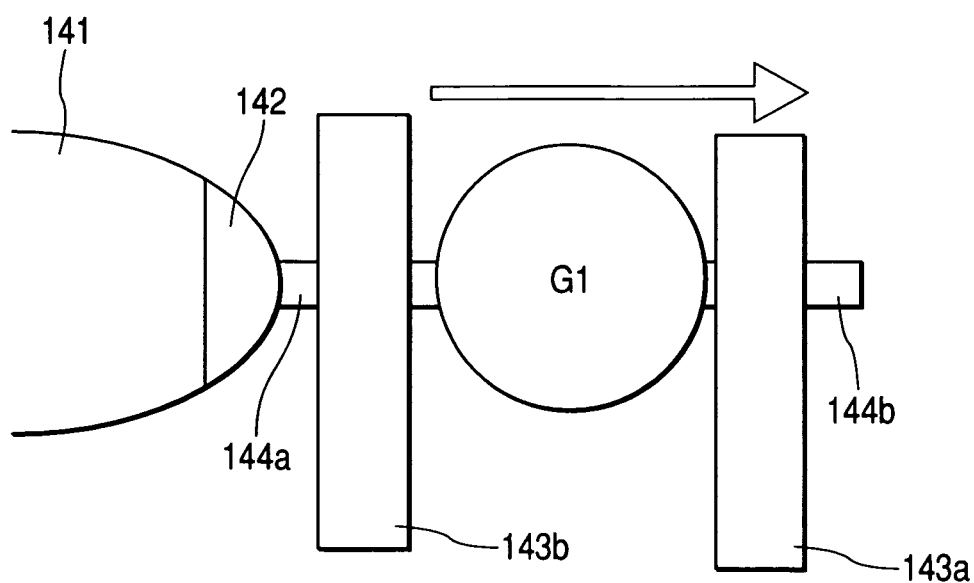

FIGS. 11A and 11B are explanatory views showing a fifth embodiment concerned with the chemical reaction cartridge and the driving mechanism.

FIGS. 11A and 11B show an entrance of a cartridge. In FIG. 11A, the entrance 141 is connected to a dome type well G1 through a flow path 144a. The well G1 is further connected to a flow path 144b for transporting a solution into the cartridge.

Although this embodiment shows the case where a zero volume structure is used as a flow path structure, a structure in which air-release paths are provided may be used instead. Although a roller is used as the pressurizing portion, a piston type actuator may be used instead.

The roller 143a is moved from right to left on the well G1 in advance so that air in the dome is released from the entrance 141 side. The roller 143a presses and blocks the flow path 144a. In this state, a large amount of a sample solution 142 is injected into the entrance 141. Then, the roller 143a is moved in the direction of the arrow to thereby squash the well G1. Since the well G1 tries to be restored to its original state in accordance with the passage of the roller 143a, the solution 142 is sucked into the well G1. As a result, a predetermined amount of the solution is sucked into the well G1. When the roller 143a passes through the well G1 and presses and blocks the flow path 146b, the roller 143b presses and blocks the flow path 144a.

As described above, a part of the solution mixed with air remains in the entrance 141, so that air can be prevented from being involved in the solution. Moreover, a predetermined amount of the solution can be provided as an initial amount for reaction.

Incidentally, the entrance may be used in combination with a U-shaped entrance as described above. The structure of the cartridge surface of the entrance may be tapered in the same manner as the U-shaped entrance.

Figure 12A:
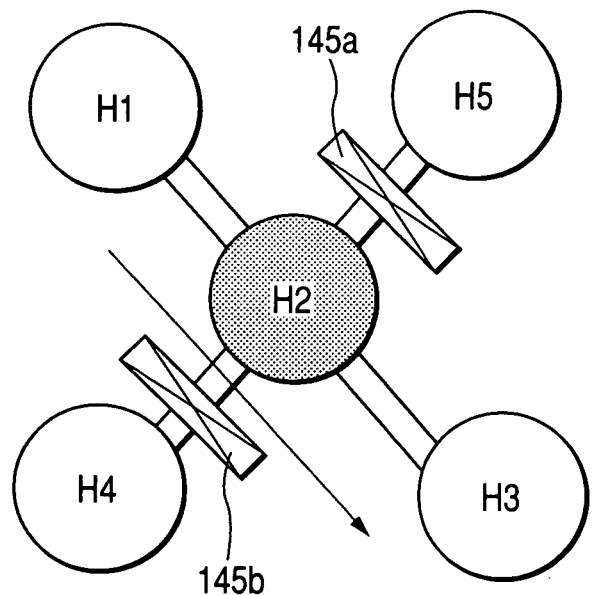
FIGS. 12A and 12B are explanatory views showing a sixth embodiment concerned with the chemical cartridge and the driving mechanism.
Figure 12B:
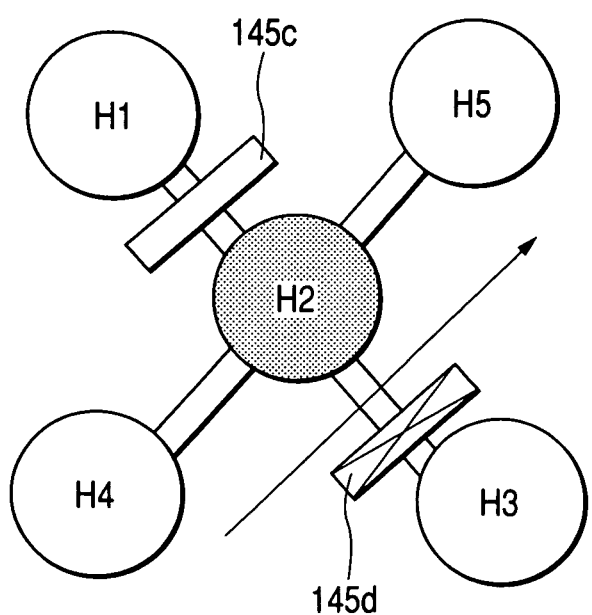

FIGS. 12A and 12B are explanatory views showing a sixth embodiment concerned with the chemical reaction cartridge and the driving mechanism.

This embodiment will be described on the case where extraction of a biopolymer such as DNA, RNA, protein, metabolite or sugar chain is taken as an example.

In FIGS. 12A and 12B, a mixture solution of a sample such as blood and a lytic solution is contained in a well H1. A DNA trap material such as silica and amino magnetic particles (surface-modified magnetic particles) is contained in a well H2. A waste is stored in a well H3. An extraction solvent is contained in a well H4. A DNA extracted solution is contained in a well H5.

These wells are arranged so crosswise that at least two kinds of different solutions can flow from different flow paths into a common well having at least two outlet flow paths. The cartridge having such a cross structure that the common well is arranged in the center while the other wells are arranged radially from the common well and connected to the common well by flow paths is driven by the following steps.

(1) Trap Step

DNA contained in the well H1 is charged with minus electricity. Silica and amino magnetic particles arranged in the well H2 are charged with plus electricity. For this reason, when the solution is transported from the well H1 to the well H3, DNA is trapped (captured) in the well H2. The residual solution is transported as a waste into the well H3.

(2) Release Step

When the extraction solvent in the well H4 is transported into the well H2 to adjust the pH and temperature after the trap step, DNA is released from the trap material. The DNA is transported into the well H5 to thereby obtain a DNA extracted solution.

In the steps, for solution transport from the well H1 to the well H3, the solution must be prevented from being transported into the wells H4 and H5. For solution transport from the well H4 to the well H5, the solution must be likewise prevented from being transported into the wells H1 and H3.

For this reason, the flow paths to the wells H4 and H5 are blocked by shutters 145a and 145b as shown in FIG. 12A when the solution in the well H1 is transported into the well H3. Moreover, the flow paths to the wells H1 and H3 are blocked by shutters 145c and 145d as shown in FIG. 12B when the solution in the well H4 is transported into the well H5. Incidentally, each of the shutters may be a roller for solution transport.

Although this embodiment shows the case where a zero volume structure is used as the structure of each of the wells and flow paths, a structure in which air-release paths are provided may be used instead. Although rollers not shown are used as the pressurizing portion for transporting solutions, piston type actuators may be used instead.

Beads, a filter, a column, a fiber, etc. can be used as trap material. Examples of beads include silica, magnetic beads, metal beads, and resin beads.

As described above, for example, a structure (cross structure) for extraction of nucleic acid from a sample by using silica, magnetic particles or the like and purification (e.g. separation of a product from non-reacted substances) after PCR (Polymerase Chain Reaction) amplification can be achieved.

Figure 13A:
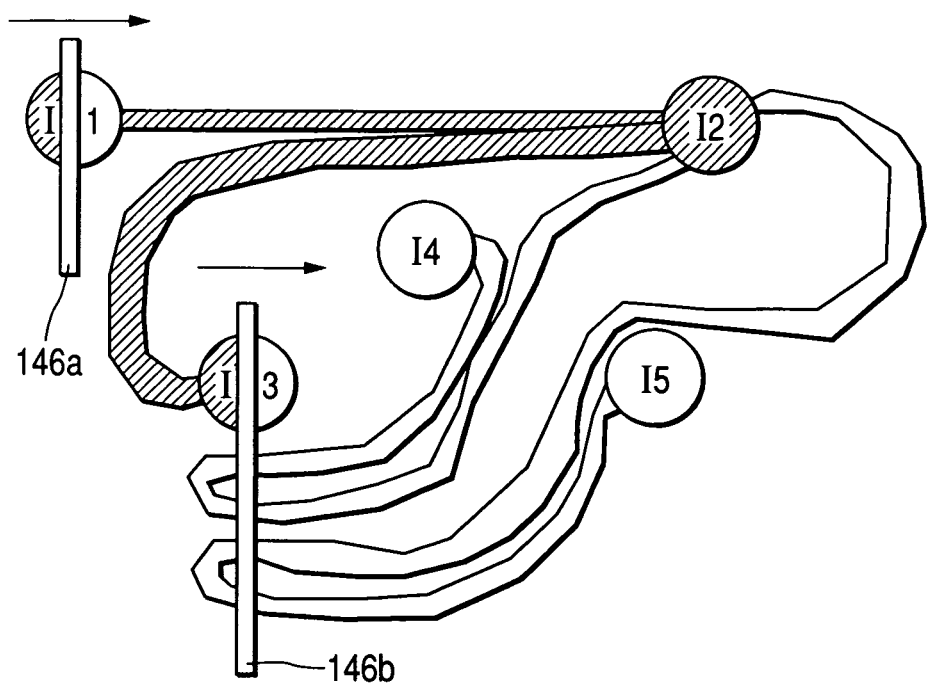
FIGS. 13A and 13B are explanatory views showing a seventh embodiment concerned with the chemical cartridge and the driving mechanism.
Figure 13B:
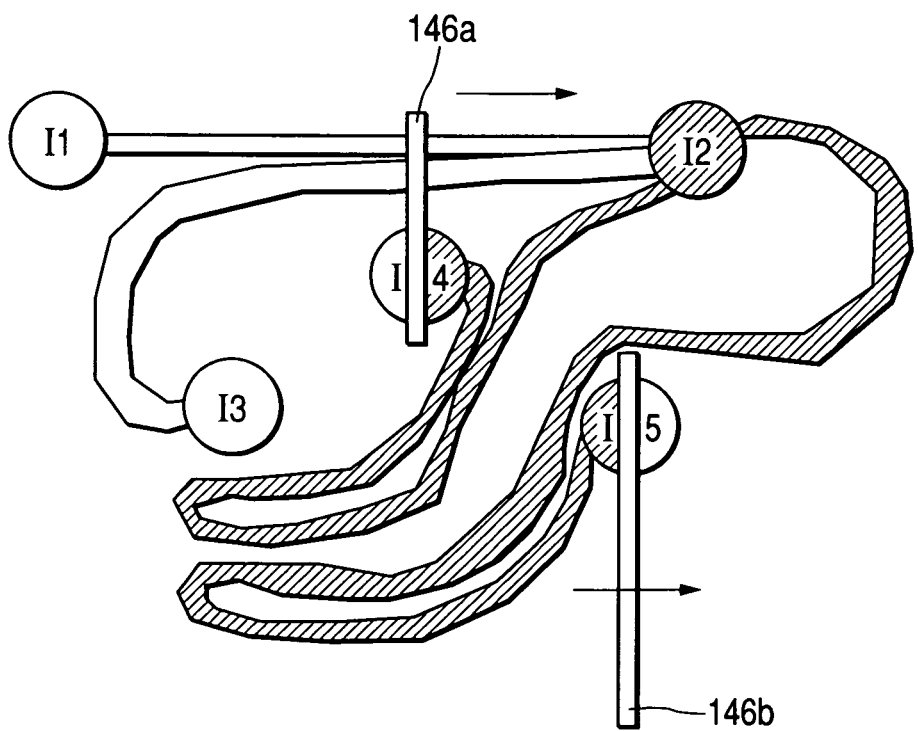

FIGS. 13A and 13B are explanatory views showing a seventh embodiment concerned with the chemical reaction cartridge and the driving mechanism.

This embodiment also achieves the trap step and the release step.

In FIGS. 13A and 13B, a mixture solution of a sample such as blood and a lytic solution is contained in a well I1. A DNA trap material such as silica, amino magnetic particles (surface-modified magnetic particles), etc. is contained in a well I2. A waste is stored in a well I3. An extraction solvent is contained in a well I4. A DNA extracted solution is contained in a well I5. The wells I1, I3, I4 and I5 are connected to the well I2 through flow paths. Rollers for applying external force are arranged so that solutions are transported through specific wells or flow paths while flow paths not used for transport of solutions are blocked. Such wells are arranged so crosswise that at least two kinds of different solutions flow from different flow paths into a common well having at least two outlet flow paths.

Specifically, as shown in FIG. 13A, the rollers 146a and 146b are rotated and moved in the direction of the arrow to thereby push out the solution in the well I1 to transport the solution into the well I2. The hatched portion expresses a path through which the solution is transported. On this occasion, the roller 146b blocks the flow paths which connect the wells I2 and I4 to each other and connect the wells I2 and I5 to each other. Accordingly, the solution delivered to the well I2 is transported as a waste into the well I3 after a biopolymer in the sample is trapped in the well I2.

When the rollers 146a and 146b are further moved to positions shown in FIG. 13B, the roller 146a pushes out the extraction solvent in the well I3 and blocks the flow paths which connect the wells I2 and I1 to each other and connect the wells I2 and I3 to each other. For this reason, the extraction solvent in the well I4 is transported into the well I2. In the well I2, DNA is released from the trap material. The DNA extracted solution obtained thus is transported into the well I5. Although this embodiment shows the case where a zero volume structure is used as a well structure, a structure in which air-release paths are provided may be used instead. Although rollers are used as the pressurizing portion, piston type actuators may be used instead.

As described above, for example, a structure (cross structure) for extraction of nucleic acid from a sample by using silica, magnetic particles or the like and purification (e.g. separation of a product from non-reacted substances) after PCR amplification can be achieved in spite of a simple structure.

Figure 14A:
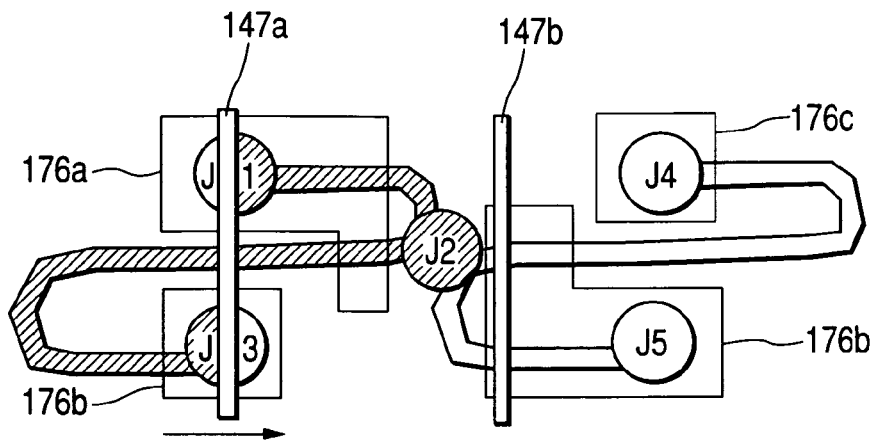
FIGS. 14A to 14C are explanatory views showing an eighth embodiment concerned with the chemical cartridge and the driving mechanism.
Figure 14B:
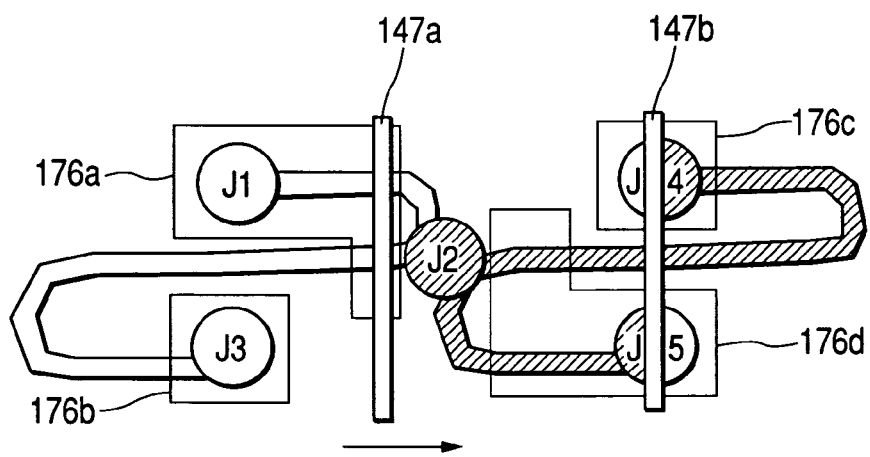
Figure 14C:
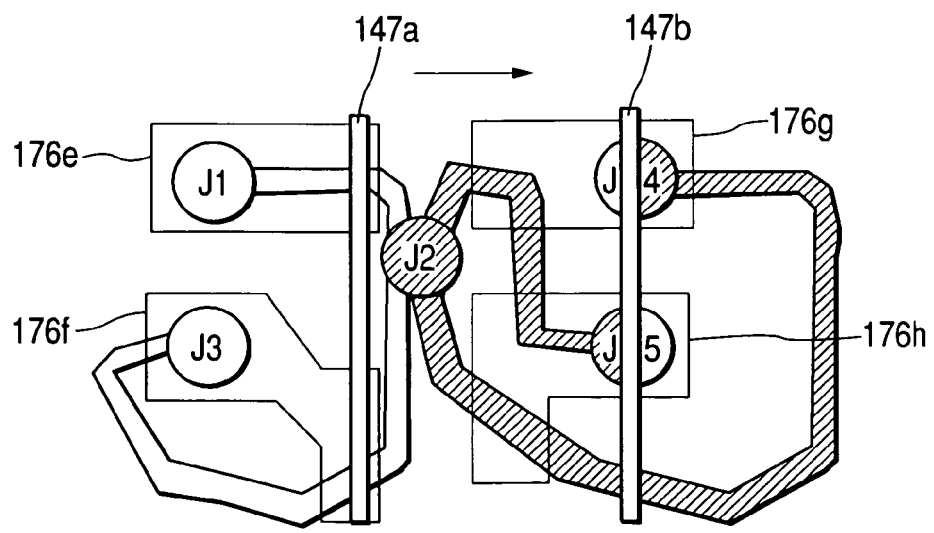

FIGS. 14A to 14C are explanatory views showing an eighth embodiment concerned with the chemical reaction cartridge and the driving mechanism.

This embodiment also achieves the biopolymer trap step and the release step.

In FIGS. 14A to 14C, a mixture solution of a sample such as blood and a lytic solution is contained in a well J1. A DNA trap material such as silica, amino magnetic particles (surface-modified magnetic particles), etc. is contained in a well J2. A waste is stored in a well J3. An extraction solvent is contained in a well J4. A DNA extracted solution is contained in a well J5. The wells J1, J3, J4 and J5 are connected to the well J2 through flow paths. Rollers for applying external force are arranged so that one of the rollers transports a solution into a specific well or flow path while the other roller blocks flow paths not used for solution transport. Such wells are arranged so crosswise that at least two kinds of different solutions flow from different flow paths into a common well having at least two outlet flow paths.

The wells have convex portions 176a to 176h in portions touching the rollers which give external force from the outside of the vessel of the cartridge. Each flow path for connecting two wells to each other is formed in a concave portion between the convex portions of the two wells.

Incidentally, the convex portion may be formed in either of the cartridge or the roller. When two well are pressed by one roller, the convex portion may have such a structure that the convex portion does not extend over a flow path so as not to block the flow path.

Although this embodiment shows the case where a zero volume structure is used as a well structure, a structure in which air-release paths are provided may be used instead. Although rollers are used as the pressurizing portion, piston type actuators may be used instead.

Specifically, as shown in FIG. 14A, the roller 147a is rotated and moved in the direction of the arrow while pushing the convex portions 176a and 176b. As a result, the solution in the well J1 is pushed out so as to be transported into the well J2. The hatched portion expresses an S-shaped flow path through which the solution is transported. On this occasion, the roller 147b blocks the flow paths which are located below the convex portion 176d and which connect the wells J2 and J4 to each other and connect the wells J2 and J5 to each other. Accordingly, the sample solution delivered to the well J2 is transported as a waste into the well J3 after a biopolymer in the sample is trapped in the well J2.

When the rollers 147a and 147b are further moved to positions shown in FIG. 14B, the roller 147b pushes out the extraction solvent in the well J4. On this occasion, the roller 147a blocks the flow paths which are located below the convex portion 176a and which connect the wells J2 and J1 to each other and connect the wells J2 and J3 to each other. For this reason, the extraction solvent in the well J4 is transported into the well J2. In the well J2, DNA is released from the trap material. The DNA extracted solution obtained thus is transported into the well J5.

Although FIGS. 14A and 14B show the case where an S-shaped flow path is provided between wells, a flow path outside wells as shown in FIG. 14C may be used instead.

As described above, for example, a structure (cross structure) for extraction of nucleic acid from a sample by using silica, magnetic particles or the like and purification (e.g. separation of a product from non-reacted substances) after PCR amplification can be achieved.

Figure 15A:
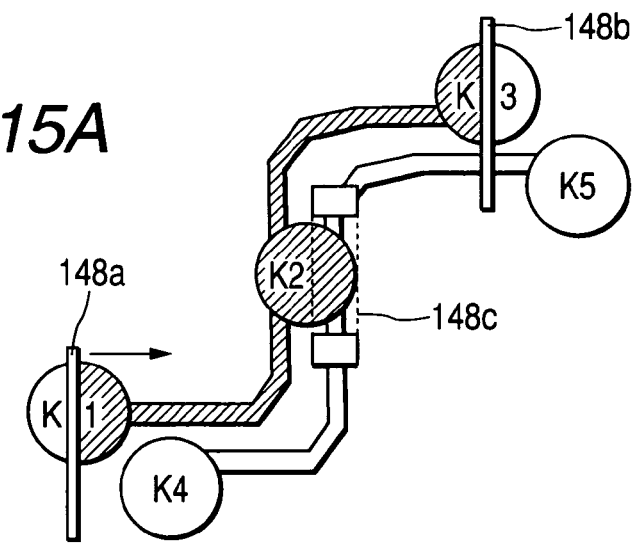
FIGS. 15A to 15C are explanatory views showing a ninth embodiment concerned with the chemical cartridge and the driving mechanism.
Figure 15B:
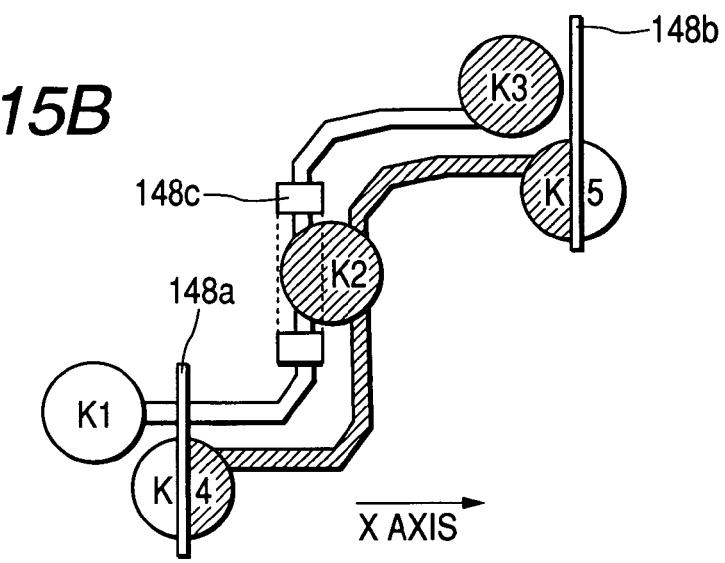
Figure 15C:
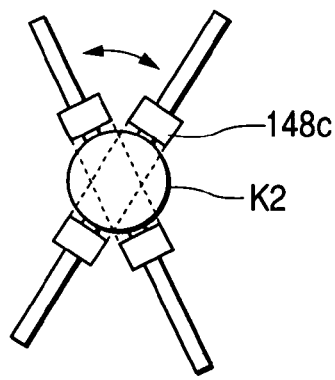

FIGS. 15A to 15C are explanatory views showing a ninth embodiment concerned with the chemical reaction cartridge and the driving mechanism.

This embodiment also achieves the biopolymer trap step and the release step.

In FIGS. 15A to 15C, a mixture solution of a sample such as blood and a lytic solution is contained in a well K1. A DNA trap material such as silica, amino magnetic particles (surface-modified magnetic particles), etc. is contained in a well K2. A waste is stored in a well K3. An extraction solvent is contained in a well K4. A DNA extracted solution is contained in a well K5.

Although this embodiment shows the case where a zero volume structure is used as a well structure, a structure in which air-release paths are provided may be used instead. Although rollers are used as the pressurizing portion, piston type actuators may be used instead. The wells K1, K3, K4 and K5 are connected to the well K2 through flow paths. The wells are arranged so crosswise that at least two kinds of different solutions flow from different flow paths into a common well having at least two outlet flow paths. The input and output sides (to the common well) of any other flow path than the flow path passing through the common well are blocked simultaneously by one roller.

Specifically, as shown in FIG. 15A, the roller 148a is rotated and moved in the direction of the arrow to push out the solution in the well K1 and transport the solution into the well K2. The hatched portion expresses a path through which the solution is transported. On this occasion, the roller 148c shaped like a wheel and having a structure pressurized at opposite ends blocks the flow path which connects the wells K4 and K5 to each other through the well K2. Accordingly, the sample solution delivered to the well K2 is transported as a waste into the well K3 after a biopolymer in the sample is trapped in the well K2.

Then, the roller 148c is moved back on the same axis (X axis) as those of the rollers 148a and 148b and blocks the flow paths which connect the wells K2 and K1 to each other and connect the wells K2 and K3 to each other. When the rollers 148a and 148b are further moved to positions shown in FIG. 15B, the roller 148a pushes out the extraction solvent in the well K4. Accordingly, the extraction solvent in the well K4 is transported into the well K2. In the well K2, DNA is released from the trap material. The DNA extracted solution obtained thus is transported into the well K5.

If the flow paths to be used for solution transport are not parallel as shown in FIGS. 15A and 15B but crossed, the roller 148c may be not moved in parallel but rotated as shown in FIG. 15C to change the flow path to be blocked.

As described above, for example, a structure (cross structure) for extraction of nucleic acid from a sample by using silica, magnetic particles or the like and purification (e.g. separation of a product from non-reacted substances) after PCR amplification can be achieved.

FIGS. 16A to 16E are explanatory views showing a tenth embodiment concerned with the chemical reaction cartridge and the driving mechanism.

This embodiment also achieves the biopolymer trap step and the release step.

In FIGS. 16A to 16E, a mixture solution of a sample such as blood and a lytic solution is contained in a well L1. A DNA trap material such as silica, amino magnetic particles (surface-modified magnetic particles), etc. is contained in a well L2. A waste is stored in a well L3. An extraction solvent is contained in a well L4. A DNA extracted solution is contained in a well L5.

Although this embodiment shows the case where a zero volume structure is used as a well structure, a structure in which air-release paths are provided may be used instead. Although rollers are used as the pressurizing portion, piston type actuators may be used instead.

The wells L1, L3, L4 and L5 are connected to the well L2 through flow paths. The wells are arranged so crosswise that at least two kinds of different solutions flow from different flow paths into a common well having at least two outlet flow paths. The input and output sides (to the common well) of any other flow path than the flow path passing through the common well are blocked simultaneously by one roller. There is provided a cross structure in which the common well is arranged in the center while the other wells are arranged radially from the common well and connected to the common well through flow paths.

Rollers for transporting solutions through the flow paths respectively are moved in different axial directions such as a vertical direction (Y) and a horizontal direction (X) in a surface of the cartridge.

Figure 16A:
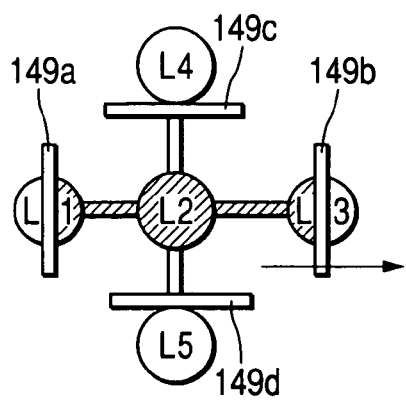
FIGS. 16A to 16E are explanatory views showing a tenth embodiment concerned with the chemical cartridge and the driving mechanism.

Specifically, as shown in FIG. 16A, the rollers 149a and 149b are rotated and moved in the direction of the arrow to push out the solution in the well L1 and transport the solution into the well L2. The hatched portion expresses a path through which the solution is transported. On this occasion, the roller 149c blocks the flow path which connects the wells L2 and L4 to each other while the roller 149d blocks the flow path which connects the wells L2 and L5 to each other. Accordingly, the sample solution delivered to the well L2 is transported as a waste into the well L3 after a biopolymer in the sample is trapped in the well L2.

Then, the roller 149c is moved to a neighbor (not shown) of the inlet of the well L4 to push out the extraction solvent in the well L4. To block the flow path which connects the wells L1 and L2 to each other and the flow path which connects the wells L3 and L2 to each other, the rollers 149a and 149b are moved on the flow paths.

Figure 16B:
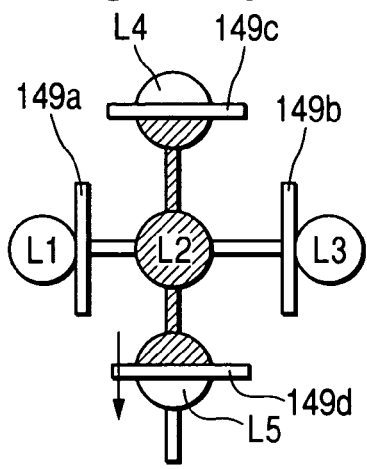

When the rollers 149c and 149d are moved in the direction of the arrow as shown in FIG. 16B, the extraction solvent in the well L4 is transported into the well L2. In the well L2, DNA is released from the trap material. The DNA extracted solution obtained thus is transported into the well L5. On this occasion, the roller 149c is moved so as to once depart from a surface of the cartridge if necessary.

Figure 16C:
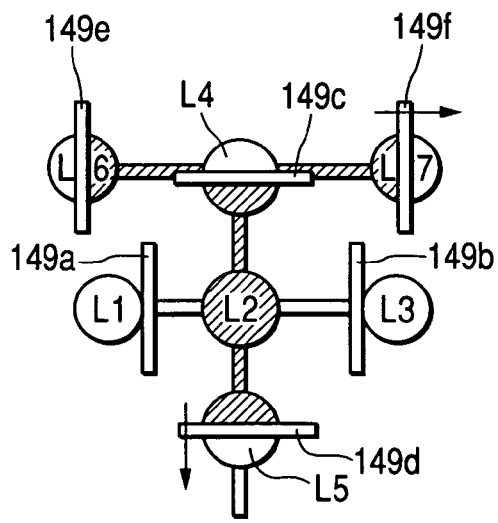

Alternatively, rollers may be configured so multisatageously that the solution transported from the well L6 into the wells L4 and L7 by rollers 149e and 149f is further transported from the well L4 into the well L2 by rollers 149c and 149d as shown in FIG. 16C.

Figure 16D:
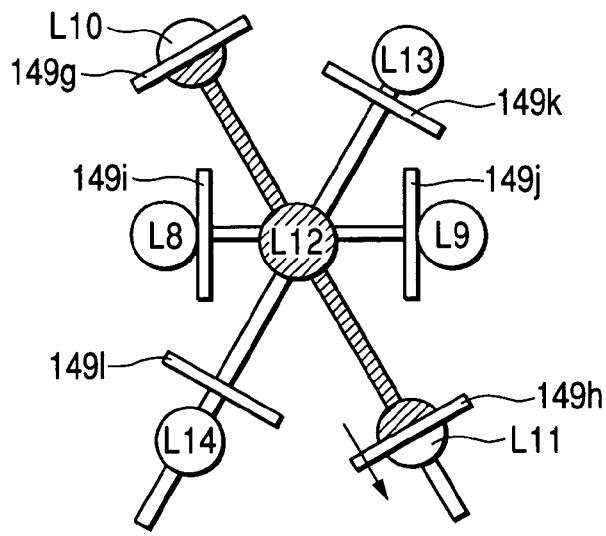
Figure 16E:
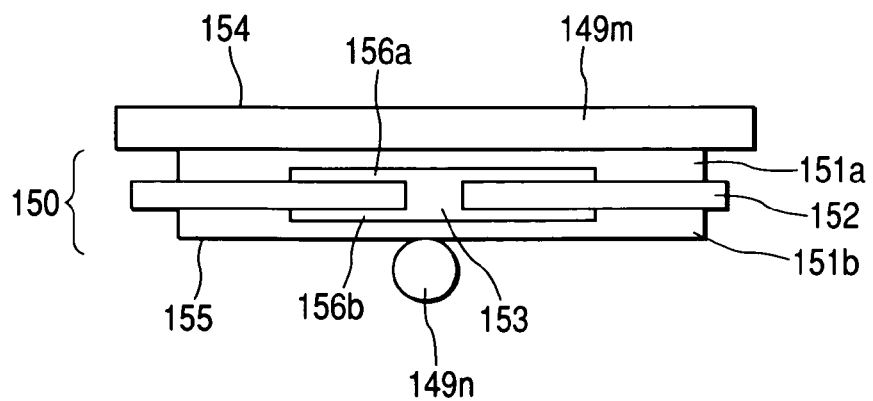

As shown in FIG. 16D, the number of flow paths crossing each other may be three or more. The angle between adjacent flow paths need not be 90°. In addition, in this embodiment, if rollers collide with each other, there may be provided a structure in which one of the rollers is disposed on an opposite side (rear surface of the cartridge) as shown in FIG. 16E. In FIG. 16E, a cartridge 150 has elastic bodies 151a and 151b made of airtight elastic rubber or the like, and a flat substrate 152 made of a rigid material. The substrate 152 is sandwiched between the elastic bodies 151a and 151b and bonded thereto. Flow paths 156a and 156b are provided between the elastic body 151a and the substrate 152 and between the elastic body 151b and the substrate 152, respectively. These flow paths are flow paths passing through the common well.

A through-hole 153 is provided in the substrate 152 so that the flow paths 156a and 156b are connected to each other by the through-hole 153. A roller 149m is provided on the front surface 154 side of the cartridge 150 so that a solution is transported through the flow path 156a. A roller 149n is provided on the rear surface 155 side of the cartridge 150 so that a solution is transported through the flow path 156b. Accordingly, the rollers 149m and 149n never collide with each other.

Incidentally, viscoelastic bodies or plastic bodies may be used as the elastic bodies 151a and 151b of the cartridge.

Glass, metal, rigid resin or an elastic body may be used as the material of the substrate 152. The elastic bodies 151a and 151b and the substrate 152 may be bonded to one another by adhesion or by other means such as suction (e.g. between PDMS and glass), ultrasonic treatment, heating, plasma adhesive treatment or vibrational welding.

As described above, for example, a structure (cross structure) for extraction of nucleic acid from a sample by using silica, magnetic particles or the like and purification (e.g. separation of a product from non-reacted substances) after PCR amplification can be achieved.

FIGS. 17A to 17G are explanatory views showing an eleventh embodiment concerned with the chemical reaction cartridge and the driving mechanism.

This embodiment also achieves the biopolymer trap step and the release step. Incidentally, this embodiment will be described on the case where extraction of DNA is taken as an example.

In FIGS. 17A to 17G, a sample 158 which is a mixture solution of a sample such as blood and a lytic solution is contained in a well M1. A DNA trap material 159 such as silica, amino magnetic particles (surface-modified magnetic particles), etc. is contained in a well M2. The trap material is fixed in the well M2 by magnetic force of a magnet provided on the outside. An extraction buffer solution 160 is contained in a well M3. The wells M1 and M3 are connected to the well M2 through flow paths and arranged so that one of rollers giving external force transports a solution for a specific well or flow path while the other rollers block flow paths not used for solution transport. Such wells are arranged so crosswise that flow paths used for solution transport and flow paths to be blocked pass through a common well. The flow paths passing through the common well are arranged so linearly as to be adjacent to each other with the common well as its center. A plurality of the pressurizing portions for transporting solutions into the flow paths respectively are moved on a line of arrangement of the flow paths in a surface of the cartridge.

Though not shown, a flow path for injecting a sample and a flow path as an extracted product outlet are provided in the wells M1 and M3 respectively. Specifically, a state shown in FIG. 17A changes to a state shown in FIG. 17G. As shown FIG. 17A, the roller 157a blocks the inlet of the well M1, the roller 157b blocks the flow path connecting the wells M1 and M2 to each other, and the roller 157c blocks the outlet of the well M3.

The rollers 157a and 157b are rotated and moved in the direction of the arrow. The roller 157a pushes out the sample 158 in the well M1 and then blocks the flow path connecting the wells M1 and M2. The roller 157b is moved from the flow path connecting the wells M1 and M2 to each other to block the path connecting the wells M2 and M3. As a result, the sample 158 in the well M1 is transported into the well M2.

Figure 17A:
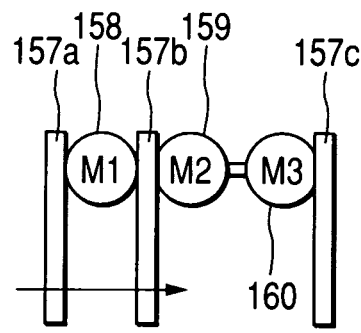
FIGS. 17A to 17G are explanatory views showing an eleventh embodiment concerned with the chemical cartridge and the driving mechanism.
Figure 17B:
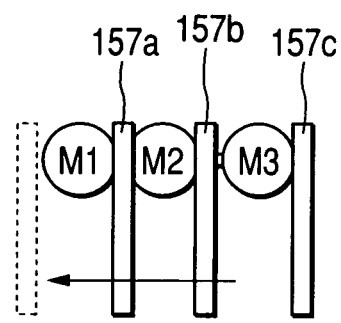
Figure 17C:
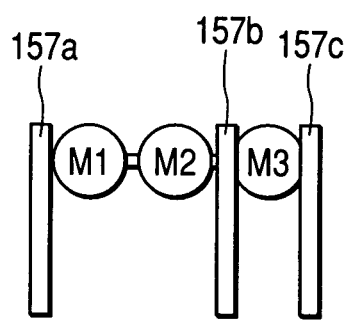

Then, as shown in FIG. 17B, the roller 157a is moved back (in the direction of the arrow) to its original position. When this reciprocating motion is repeated, the sample 158 and the trap material are mixed with each other in the well M2 efficiently. Thus, capture of DNA in magnetic particles is completed. When the trap step is completed, the roller 157a returns to the initial position and the roller 157b blocks the flow path connecting the wells M2 and M3 (FIG. 17C).

Figure 17D:
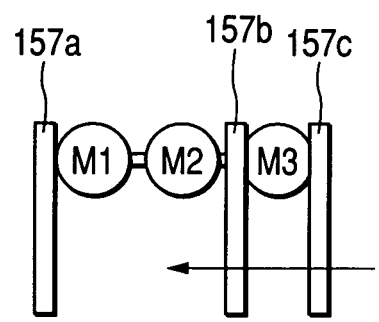
Figure 17E:
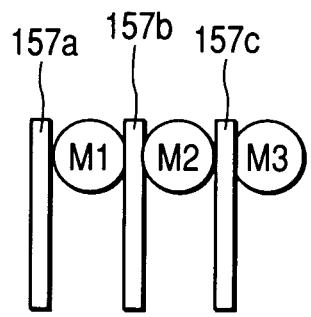

Next, as shown in FIG. 17D, the rollers 157b and 157c are moved in the direction of the arrow. The roller 157b returns to its original position (shown in FIG. 17A) while pushing the well M2, so that a part of the sample 158 remaining in the well M2 is removed. The roller 157c pushes out the extraction buffer solution 160 in the well M3, transports the extraction buffer solution 160 into the well M2 and blocks the flow path connecting the wells M2 and M3 to each other (FIG. 17E). In this state, a DNA releasing process is performed while the well M2 is held.

Figure 17F:
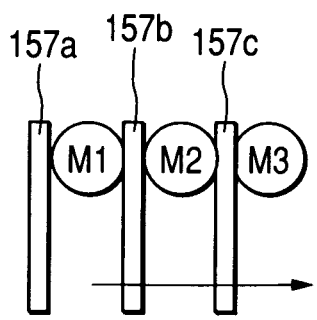
Figure 17G:
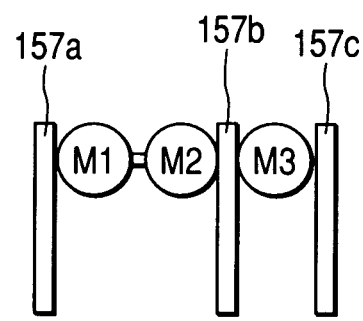

When the DNA releasing process is completed, the rollers 157b and 157c are moved in the direction of the arrow (reverse to the direction shown in FIG. 17D) as shown in FIG. 17F. The roller 157b pushes out the extracted product in the well M2 and then blocks the flow path connecting the wells M2 and M3 to each other. The roller 157c is moved from the flow path connecting the wells M2 and M3 to each other and returns to the initial position (FIG. 17G). As a result, the extracted product is transported into the well M3. Thus, the DNA extraction step is completed.

FIGS. 18A to 18F are explanatory views showing a twelfth embodiment concerned with the chemical reaction cartridge and the driving mechanism.

This embodiment also achieves the biopolymer trap step and the release step. Incidentally, this embodiment will be described on the case where extraction of DNA is taken as an example like the eleventh embodiment.

In FIGS. 18A to 18F, a sample 162 which is a mixture solution of a sample such as blood and a lytic solution is contained in a well N1. A DNA trap material 163 such as silica, amino magnetic particles (surface-modified magnetic particles), etc. is contained in a well N2. The trap material is fixed in the well N2 by magnetic force of a magnet provided on the outside. An extraction buffer solution 164 is contained in a well N3. The wells N1 and N3 are connected to the well N2 through flow paths and arranged so that one of rollers giving external force transports a solution for a specific well or flow path while the other rollers block flow paths not used for solution transport. Such wells are arranged so crosswise that flow paths used for solution transport and flow paths to be blocked pass through a common well. The flow paths passing through the common well are arranged so linearly as to be adjacent to each other with the common well as its center. A plurality of the pressurizing portions for transporting solutions into the flow paths respectively are moved on a line of arrangement of the flow paths in a surface of the cartridge. Though not shown, a flow path for injecting a sample and a flow path as an extracted product outlet are provided in the wells N1 and N3 respectively.

Figure 18A:
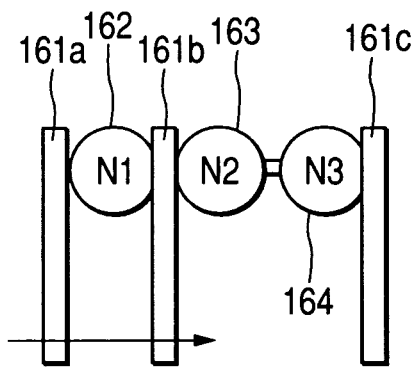
FIGS. 18A to 18F are explanatory views showing a twelfth embodiment concerned with the chemical cartridge and the driving mechanism.
Figure 18B:
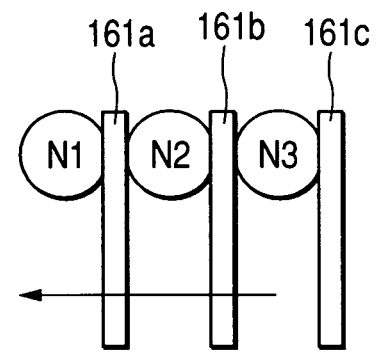
Figure 18C:
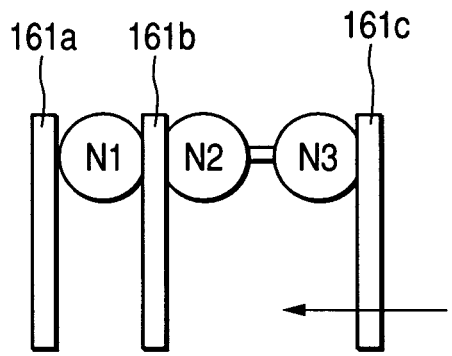
Figure 18D:
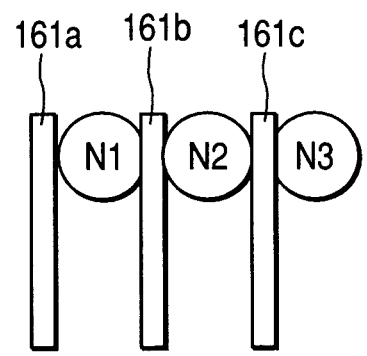
Figure 18E:
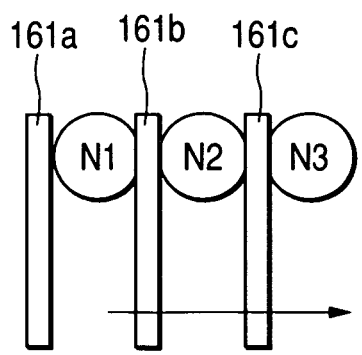
Figure 18F:
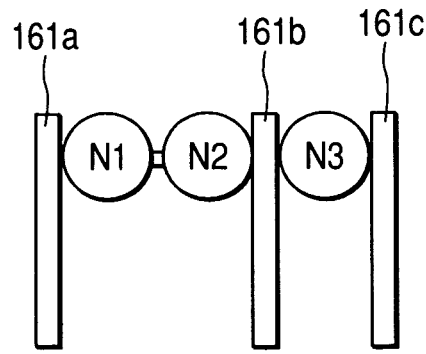

Specifically, a state shown in FIG. 18A changes to a state shown in FIG. 18F. As shown FIG. 18A, the roller 161a blocks the inlet of the well N1, the roller 161b blocks the flow path connecting the wells N1 and N2 to each other, and the roller 161c blocks the outlet of the well N3.

The rollers 161a and 161b are rotated and moved in the direction of the arrow. The roller 161a pushes out the sample 162 in the well N1 and then blocks the flow path connecting the wells N1 and N2. The roller 161b is moved from the flow path connecting the wells N1 and N2 to each other to block the flow path connecting the wells N2 and N3. As a result, the sample 162 in the well N1 is transported into the well N2.

Then, as shown in FIG. 18B, the rollers 161a and 161b are moved back (in the direction of the arrow) to its original position. When this reciprocating motion is repeated, the sample 162 and the trap material 163 are mixed with each other in the well M2 efficiently. Thus, capture of DNA in magnetic particles is completed. When the trap step is completed, the rollers 161a and 161b return to their initial positions (FIG. 18C). As a result, the sample remaining in the well N2 is removed and dried.

Next, as shown in FIG. 18C, the roller 161c is moved in the direction of the arrow. The roller 161c pushes out the DNA buffer solution 164 in the well N3, transports the DNA buffer solution 164 into the well N2 and blocks the flow path connecting the wells N2 and N3 to each other (FIG. 18D). In this state, a DNA releasing process from the magnetic particles is performed while the well N2 is held.

When the DNA releasing process is completed, the rollers 161b and 161c are moved in the direction of the arrow (reverse to the direction shown in FIG. 18C) as shown in FIG. 18E. The roller 161b pushes out the extracted product in the well N2 and then blocks the flow path connecting the wells N2 and N3 to each other. The roller 161c is moved from the flow path connecting the wells N2 and N3 to each other and returns to the initial position (FIG. 18F). As a result, the extracted product is transported into the well N3. Thus, the DNA extraction step is completed.

Figure 19A:
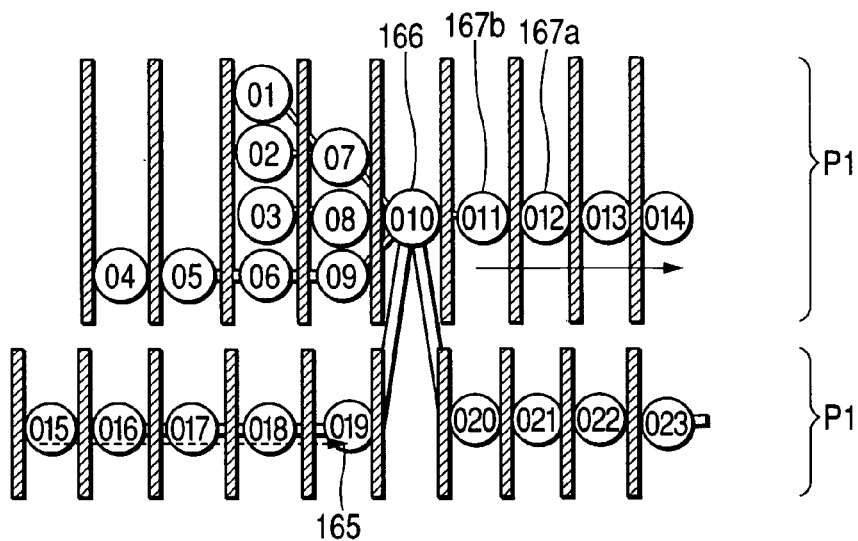
FIGS. 19A to 19C are explanatory views showing a thirteenth embodiment concerned with the chemical cartridge and the driving mechanism.
Figure 19B:
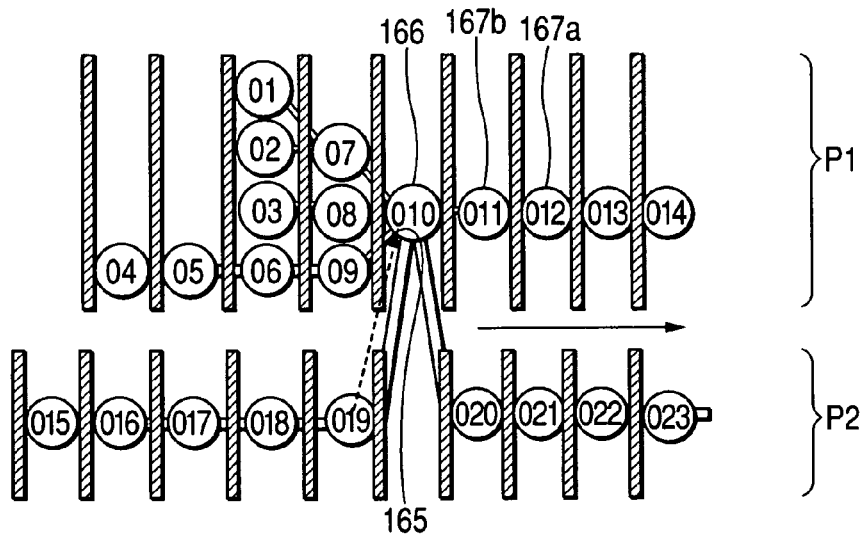
Figure 19C:
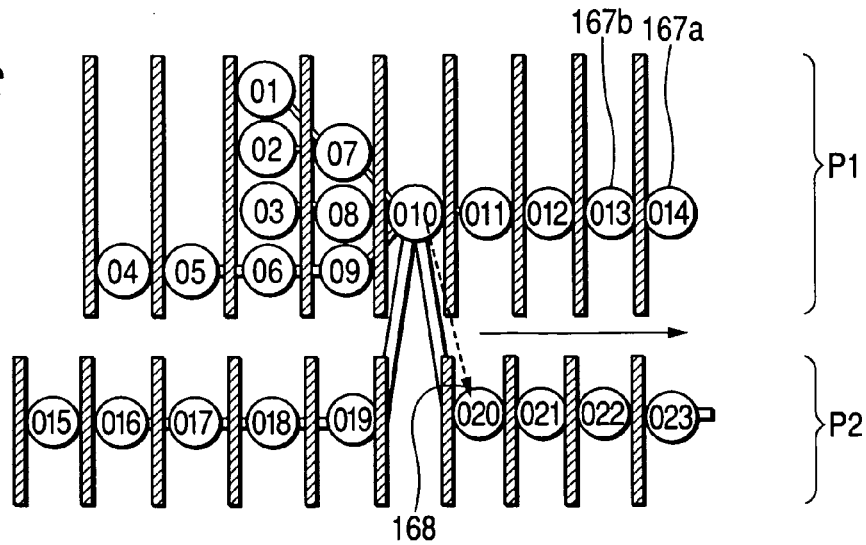

FIGS. 19A to 19C are explanatory views showing a thirteenth embodiment concerned with the chemical reaction cartridge and the driving mechanism. This embodiment will be described on the case where extraction of a biopolymer such as DNA, RNA, protein or sugar chain is taken as an example.

In FIGS. 19A to 19C, wells O1 to O23 are provided in a cartridge. The wells O1 to O14 are provided in an upper stage P1. The wells O7 to O9 are connected to the well O10 as a common well and arranged in a column on the left side of the well O10. The wells O1 and O2 are connected to the well O7 as a common well and arranged in a column on the left side of the well O7. The wells O3 and O6 are arranged in the same column as that of the wells O1 and O2. The well O3 is connected to the well O8. The well O6 is connected to the well O9. The wells O5 and O4 are cascaded to the well O6 so as to be arranged in a row on the left of the well O6.

The well O11 is connected to the well O10 so as to be arranged on the right of the well O10. The wells O12 to O14 are cascaded to the well O11 so as to be arranged in a row. These wells are arranged at regular intervals of a pitch in the lateral direction (the direction of the movement of the rollers). The rollers expressed by the hatched portions are arranged at intervals of the same pitch as the lateral pitch of the wells. Wells O15 to O23 are provided in a lower stage P2 so as to be arranged in a row at regular intervals of a pitch in accordance with the vertical positions of the wells in the upper stage. The wells O19 and O20 are connected to the well O10. The well O19 is arranged so as to correspond to the column of the wells O7 to O9. The well O20 is arranged so as to correspond to the column of the well O11. A space is provided below the well O10. The wells O19 to O15 are cascaded on the left of the space. The wells O20 to O23 are cascaded on the right of the space.

Rollers in the upper and lower stages P1 and P2 are arranged at intervals of the pitch equal to the lateral pitch of the wells and block flow paths connecting the wells respectively. Although this embodiment shows the case where a zero volume structure is used as a well structure, a structure in which air-release paths are provided may be used instead. Although rollers are used as the pressurizing portions, piston type actuators may be used instead.

In FIG. 19A, a sample solution is contained in the well O1. A lytic solution is contained in the well O2. A DNA trap material (surface-modified magnetic particles) is contained in the well O3. A cleaning solution is contained in the wells O4 and O5. An extraction buffer solution is contained in the well O15. The volume of any other well is zero.

In FIG. 19A, the respective rollers in the upper stage P1 are rotated and moved in the direction of the solid-line arrow. The motion of contents in the wells in accordance with the movement of the rollers is the same as described in FIGS. 9A to 9E and will be described below in brief. The well O10 is however cleaned twice because the cleaning solution is contained in the wells O4 and O5.

When the rollers in the upper stage P1 are rotated and moved by a one-well's distance in the direction of the arrow, the sample solution in the well O1 and the lytic solution in the well O2 are mixed with each other in the well O7. The trap material in the well O3 is moved into the well O8. The cleaning solution in the wells O4 and O5 is moved into the wells O5 and O6.

In the well O7, the mixture solution is heated and subjected to a reaction process. For example, a Peltier element is used for heating the mixture solution.

When the rollers are further rotated and moved by a one-well's distance in the direction of the arrow, the mixture solution in the well O7 and the DNA trap material in the well O8 are mixed with each other in the well O10. The cleaning solution in the wells O5 and O6 is moved into the wells O6 and O9.

In the well O10, DNA is trapped in the DNA trap material. The magnetic particles as the trap material per se are trapped in the well O10 by application of a magnetic field.

When the rollers are further rotated and moved by a one-well's distance in the direction of the solid-line arrow, the waste after trapping of DNA in the well O10 is moved into the well O11. The cleaning solution in the well O9 is moved into the well O10. The cleaning solution in the well O6 is moved into the well O9. In the well O10, cleaning with the cleaning solution of magnetic particles is performed as a first cleaning cycle.

When the rollers are further rotated and moved by a one-well's distance in the direction of the arrow, the waste in the well O11 is moved into the well O12. The cleaning solution after cleaning in the well O10 is moved into the well O11. The cleaning solution for a second cleaning cycle is transported into the well O10. The cleaning solution is removed from the well O10 in accordance with the next movement of the rollers. The cleaning solution 167a for the first cleaning cycle is transported into the well O12. The cleaning solution 167b for the second cleaning cycle is transported into the well O11.

As a result, the magnetic particles 166 containing DNA trapped therein remain in the well O10, so that DNA can be extracted. In parallel with the aforementioned operation, the rollers in the lower stage P2 are moved in the direction of the solid-line arrow in synchronism with the rollers in the upper stage P1. The extraction buffer solution 165 is moved into the well O19 as represented by the broken-line arrow.

Incidentally, the wells O16 to O18 are originally empty wells which serve as dummy wells for adjusting the timing of transporting the extraction buffer solution 165 into the well O10. The presence of the dummy wells makes it possible to adjust the solution transport timing arbitrarily on the basis of the uniaxial movement of the rollers.

At this point of time, the two cleaning cycles in the well O10 are completed. The cleaning solution has been removed from the well O10. Then, the roller group in the upper stage P1 is locked and only the roller group in the lower stage P2 is moved. As a result, the extraction buffer solution in the well O19 in the lower stage P2 is transported into the well O10 as represented by the broken-line arrow. In the well O10, DNA is released (FIG. 19B).

Here, the roller groups in the upper and lower stages P1 and P2 are moved simultaneously. As a result, the DNA extracted solution 168 (product) in the well O10 is transported into the well O20. Thus, the DNA extraction step is completed (FIG. 19C). The aforementioned solution transport mechanism is similar to the motion of a shift register of a digital circuit or the like. Accordingly, it may be said that the motion of the roller groups is of a clock type.

Figure 20:
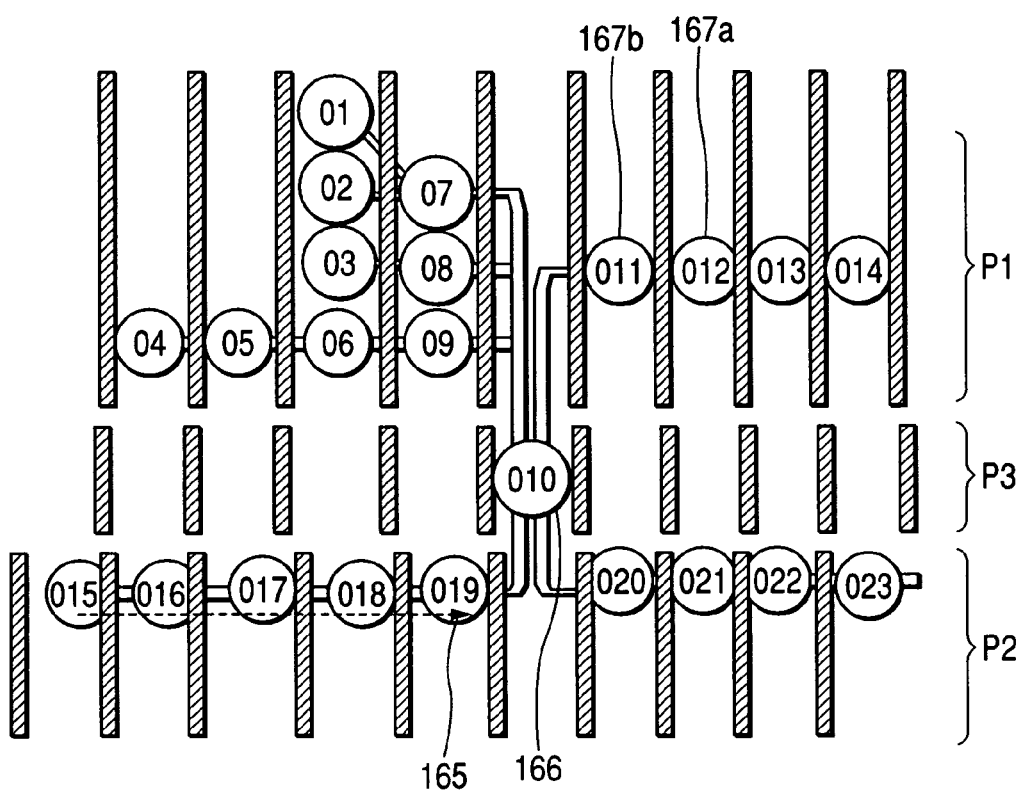
FIG. 20 is an explanatory view showing a fourteenth embodiment concerned with the chemical cartridge and the driving mechanism.

FIG. 20 is an explanatory view showing a fourteenth embodiment concerned with the chemical reaction cartridge and the driving mechanism. This embodiment is configured in such a manner that the arrangement of rollers expressed by the hatched portions in the thirteenth embodiment (FIGS. 19A to 19C) is changed from a two-stage configuration to a three-stage configuration, a roller group at intervals of the same pitch is added to a middle state P3, and the column position of the well O10 is disposed in the middle stage P3 while the horizontal positional relation is not changed. The rollers in the upper and lower stages P1 and P2 are arranged at intervals of a pitch equal to the lateral pitch of the wells and block the flow paths connecting the wells respectively.

In FIG. 20, a sample solution is contained in the well O1. A lytic solution is contained in the well O2. A DNA trap material (surface-modified magnetic particles) is contained in the well O3. A cleaning solution is contained in the wells O4 and O5. An extraction buffer solution is contained in the well O15. The volume of any other well is zero.

Although this embodiment shows the case where a zero volume structure is used as a well structure, a structure in which air-release paths are provided may be used instead. Although rollers are used as the pressurizing portions, piston type actuators may be used instead. The rollers in each stage are moved by a five-wells' distance in the direction of the solid-line arrow. As a result, the mixture solution of the sample solution and the lytic solution and the DNA trap material are transported into the well O10. DNA is trapped in magnetic particles. The cleaning solutions 167a and 167b are transported into the well O10. After cleaning, the cleaning solutions 167a and 167b are transported into the wells O11 and O12. As a result, the magnetic particles 166 containing DNA trapped therein are present in the well O10.

On this occasion, since the rollers in the lower stage P2 are moved in the same manner as described above, the extraction buffer solution 165 in the well O15 is moved into the well O19 as represented by the broken-line arrow. Then, while the roller group in the upper stage P1 is stopped, the roller groups in the middle and lower stages P3 and P2 are moved by a one-well's distance in the direction of the solid-line arrow. The extraction buffer solution 165 in the well O19 is transported into the well O10, so that DNA is released from the trap material. Then, the roller groups in the middle and lower stages P3 and P2 are moved by a one-well's distance again. The DNA extracted solution (product) obtained thus is transported from the well O10 into the well O20.

As described above, since the flow paths connecting the well O10 to the wells O7, O8, O9 and O11 are blocked by the rollers in the upper stage P1 in the DNA extraction step, DNA can be prevented from being contaminated (mixed) with the residual solution of the DNA trap material and the cleaning solution.

Figure 21A:
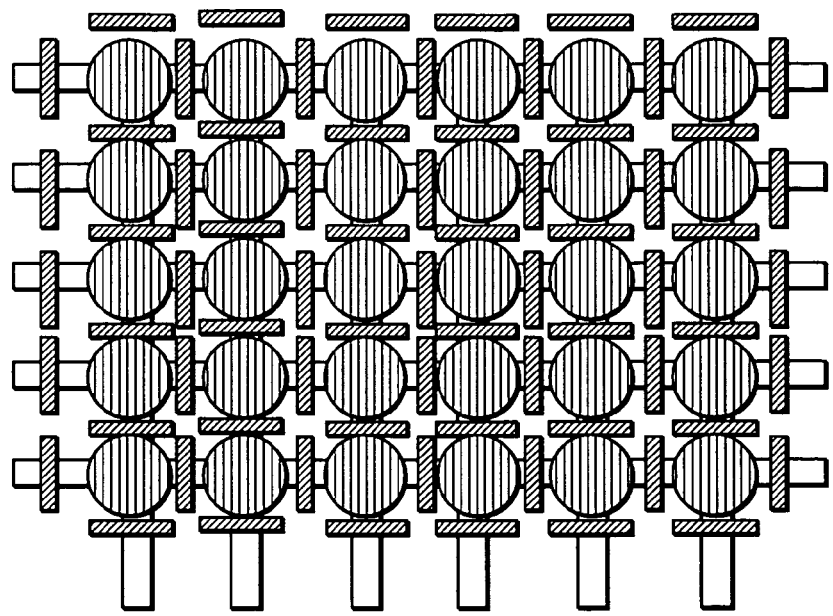
FIGS. 21A to 21C are explanatory views showing a fifteenth embodiment concerned with the chemical cartridge and the driving mechanism.
Figure 21B:
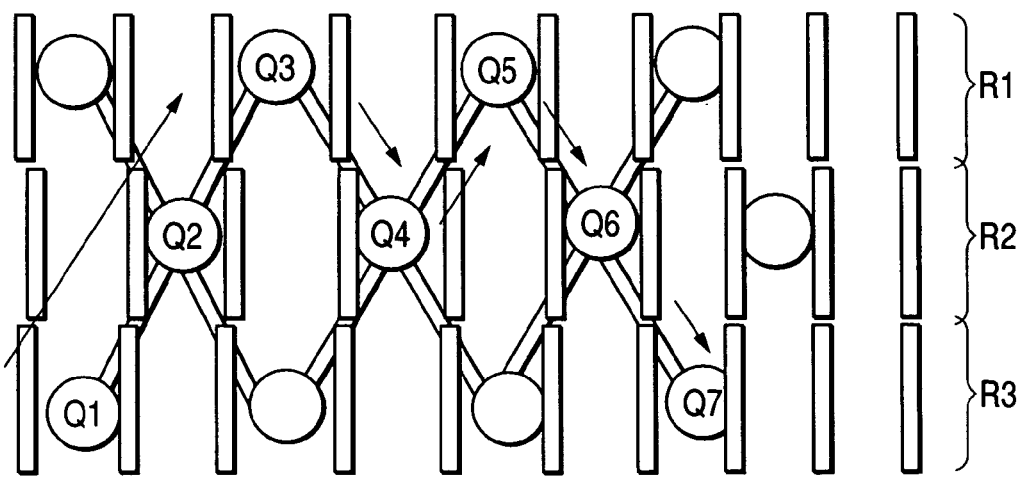
Figure 21C:
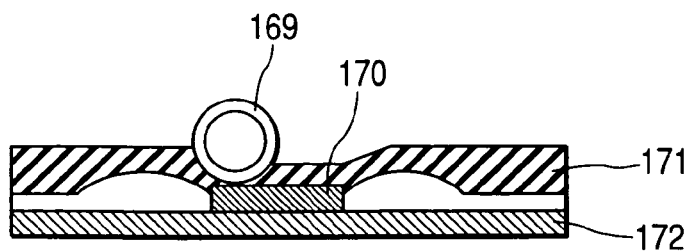

FIGS. 21A to 21C are explanatory views showing a fifteenth embodiment concerned with the chemical reaction cartridge and the driving mechanism.

In FIG. 21A, wells expressed by vertical lines are arranged so lengthwise and breadthwise that wells lengthwise and breadthwise adjacent to each other are connected to each other by a flow path. In this arrangement, rollers expressed by the hatched portions are arranged so independently that a well is sandwiched between adjacent rollers in accordance with each row or column. Roller groups in a vertical axis (X axis) and a horizontal axis (Y axis) are moved successively so that each solution can be moved into a well located in an arbitrary position.

To prevent interference between X and Y rollers, when solution transport is to be performed under pressurization by the X and Y roller groups from the same surface, Y is separated from the cartridge when X is moved. X and Y may be preferably arranged on the rear and front surfaces respectively. In this case, the cartridge used is a cartridge having a structure in which a substrate as shown in FIG. 16E is sandwiched between elastic bodies and in which flow paths are provided in opposite surfaces of the substrate and connected to each other by through-holes. The roller groups are configured so that a row or column of rollers can be integrally moved or several rollers in a row or column can be integrally moved. Incidentally, the structure of the flow paths is not limited to the lengthwise and breadthwise net structure shown in FIG. 21A. A region having no flow path may be present between adjacent wells. The flow paths may be provided obliquely as shown in FIG. 21B. The wells may be different in size and depth from one another.

In FIG. 21B, when the flow paths are arranged obliquely, each solution can be moved in an arbitrary direction of XY even in the case where the rollers are unidirectional rollers.

For example, when three roller groups provided as shown in FIG. 21B are moved while the roller group in the upper stage R1, the roller group in the middle stage R2 and the roller group in the lower stage R3 are synchronized with one another, the solution in the well Q1 is moved into the wells Q2 and Q3. When the roller group in the upper stage R1 and the roller group in the middle stage R2 are moved while synchronized with each other, the solution in the well Q3 is moved into the wells Q4, Q5 and Q6. When the roller group in the middle stage R2 and the roller group in the lower stage R3 are further moved, the solution is moved into the well Q7.

Incidentally, in the structure in which rollers are provided thus on X and Y axes, there is a tendency that a solution remains in a flow path between the rollers. In this case, as shown in FIG. 21C, a rigid body 170 may be provided in a portion of the flow path between the elastic body 171 and the substrate 172 so that the flow path can be entirely blocked when the rigid body 170 is pressed by a roller 169. For example, the rigid body 170 can be formed in such a manner that the rigid body 170 is embedded in the elastic body 171 or in such a manner that a part of the elastic body 171 is hardened.

Figure 22:
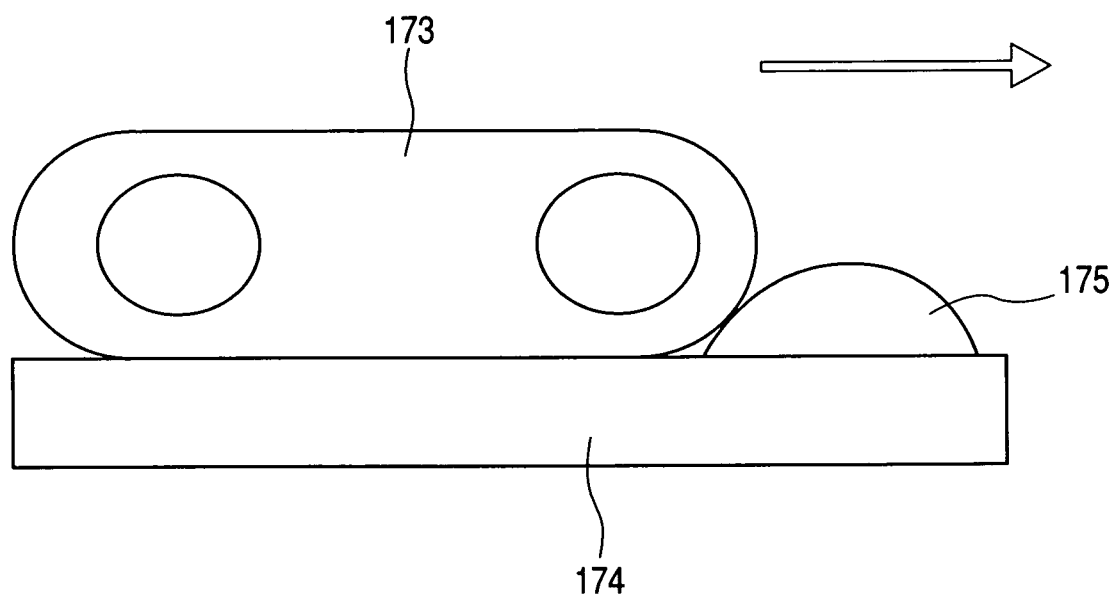
FIG. 22 is an explanatory view showing a sixteenth embodiment concerned with the chemical cartridge and the driving mechanism.

FIG. 22 is an explanatory view showing a sixteenth embodiment concerned with the chemical reaction cartridge and the driving mechanism.

Although the previous embodiments have shown the case where a roller or a piston type actuator is used as the pressurizing portion, a two-dimensional plate or caterpillar (registered trademark) having a curvature in its surface being in contact with a vessel such as a well 175 may be used as the pressurizing portion 173 so that the two-dimensional plate or caterpillar can be moved in the direction of arrow while pressed against the cartridge 174, as shown in FIG. 22. According to this measure, since the flow path or well is pressed by a surface, the solution or air can be prevented from flowing back by back pressure.

Figure 23A:
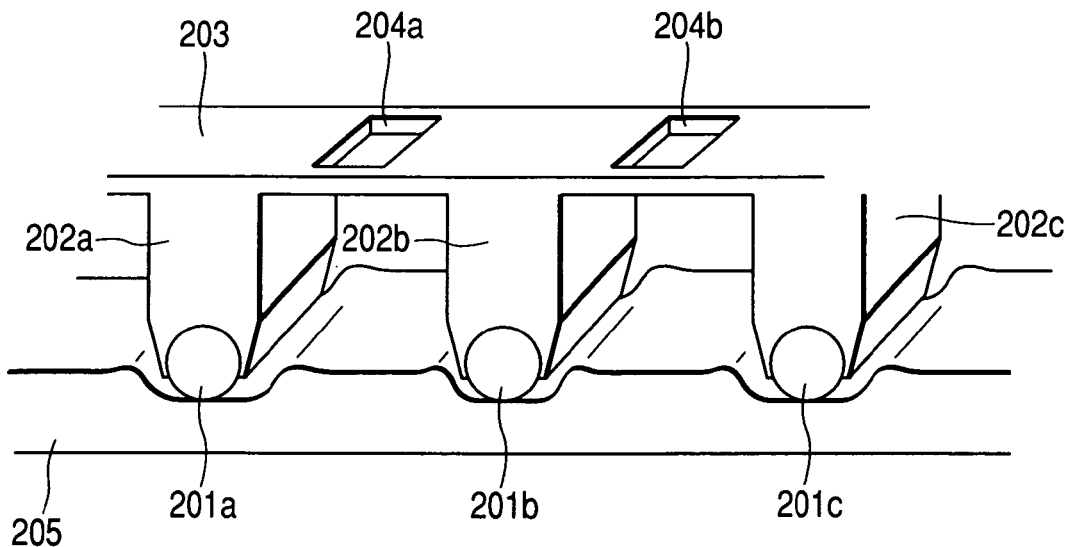
FIGS. 23A to 23C are explanatory views showing a seventeenth embodiment concerned with the chemical cartridge and the driving mechanism.
Figure 23B:
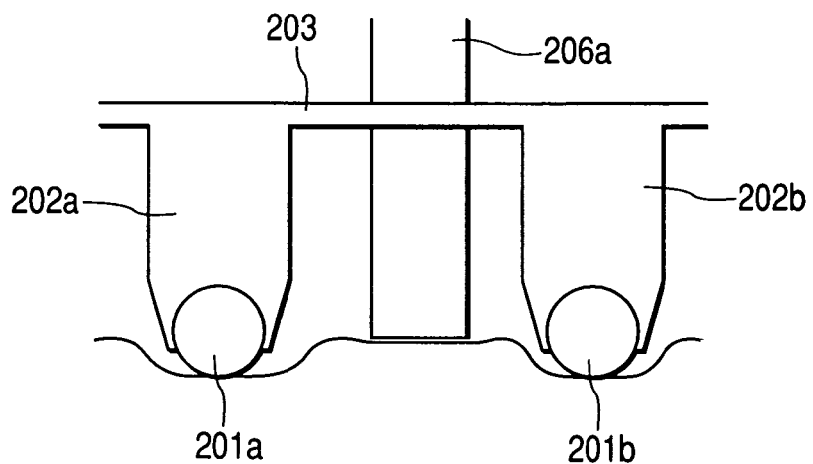
Figure 23C:
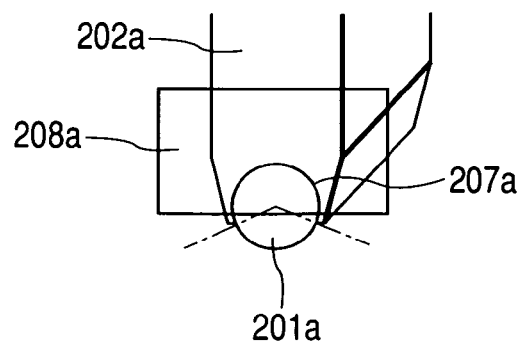

FIGS. 23A to 23C are configuration views showing a seventeenth embodiment of the chemical reaction cartridge and the driving mechanism according to the invention.

FIG. 23A is a perspective view showing the seventeenth embodiment. In FIG. 23A, rollers 201a, 201b and 201c are supported by arms 202a, 202b and 202c as roller support portions respectively. The arms 202a, 202b and 202c are attached to a base portion 203 which is shaped like a flat plate and which serves as a base for retaining the arms. Or the base portion 203 may be molded so as to be integrated with the arms 202a, 202b and 202c. For example, the materials of the rollers, arms and base portion are metals, fluororesins, or a combination thereof. Each pair of roller and arm forms a pressing portion for applying pressure on the cartridge.

The base portion 203 is attached to a mechanical stage (not shown) which can move in X, Y and Z-axis directions. When the mechanical stage moves up and down, the roller 201a applies pressure on the cartridge 205. The cartridge is fixed into the mechanical stage. When the base portion 203 is moved left and right while controlled by the stage, the rollers 201a, 201b and 201c are rotated and moved while pressing the cartridge so that the solution in the cartridge 205 is moved horizontally.

The base portion 203 has opening portions 204a and 204b. An actuator 206a is inserted into each opening portion as shown in FIG. 23B. FIG. 23B is a side view showing the seventeenth embodiment. For example, the actuator 206a is shaped like a rod made of metal. The actuator 206a applies pressure, vibration, heating, cooling or the like on the cartridge 205 to accelerate the chemical reaction in the cartridge 205. For example, a piezoelectric element is used for pressurizing and vibrating the cartridge, and a Peltier element is used for heating and cooling the cartridge.

FIG. 23C is a view showing a structure of attachment of a roller to an arm. The roller 201a is inserted into a groove 207a provided at an end of the arm 202a. The groove 207a of the arm 202a supports the roller 201a while covering the roller 201a at a higher angle than 180° as represented by the one-dot chain line. That is, since the diameter of the roller 201a is larger than the opening of the groove 207a, the roller 201a is caught in the groove 207a of the arm 202a in the principle of a ball in a ball point pen so that the roller 201a can be prevented from dropping out of the groove 207a.

A stopper member 208a is shaped like a thin film, for example, made of a fluororesin. After the roller 201a is inserted into the groove 207a, the stopper member 208a is bonded to opposite side surfaces of the groove 207a to prevent the roller 201a from dropping out. Incidentally, the roller 201a may be magnetically attracted to the arm 202a.

According to this configuration, roller groups can be disposed on the cartridge so as to be arranged adjacently in two or more rows without necessity of any superfluous space on a side surface for supporting the rollers.

Figure 24A:
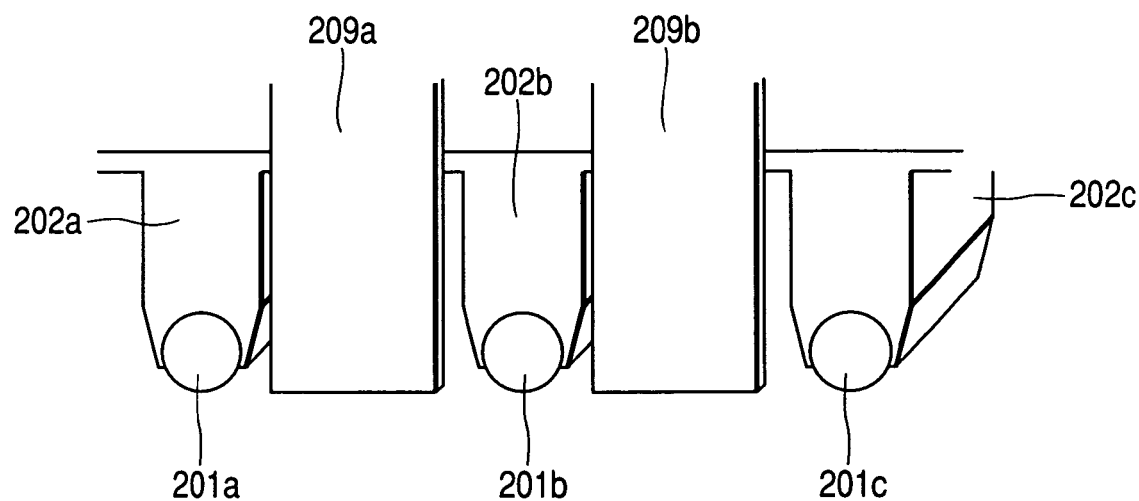
FIGS. 24A and 24B are explanatory views showing an eighteenth embodiment concerned with the chemical cartridge and the driving mechanism.
Figure 24B:
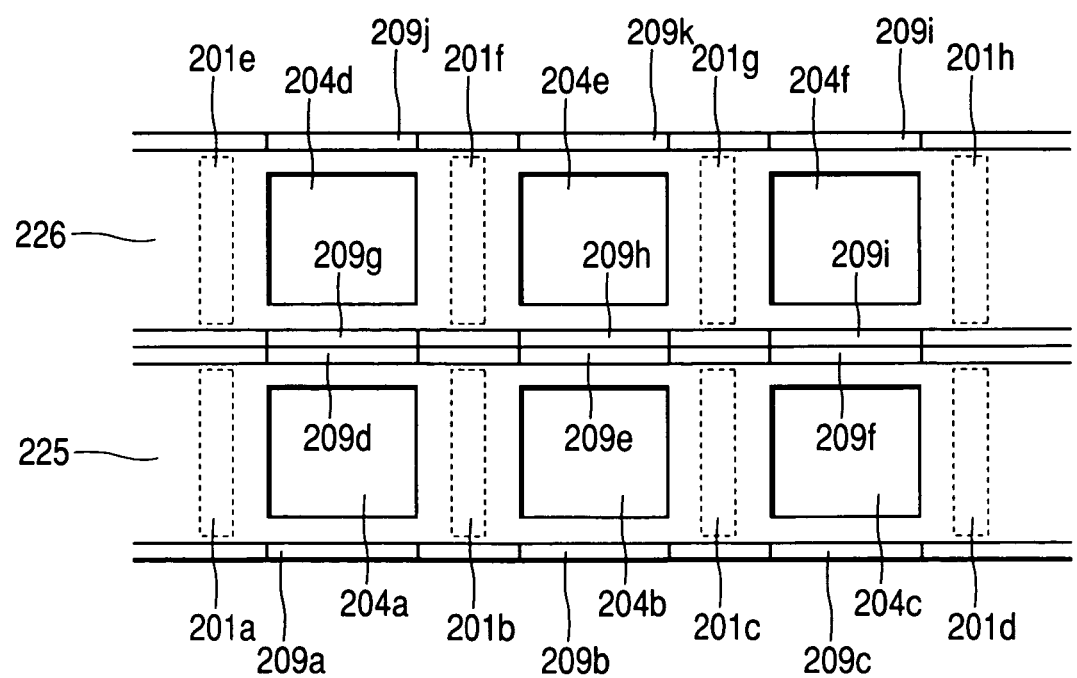

FIGS. 24A and 24B are configuration views showing an eighteenth embodiment of the chemical reaction cartridge and the driving mechanism according to the invention. FIG. 24A is a perspective view showing a structure in which a shutter 209a is provided on a side surface between the arms 202a and 202b while a shutter 209b is provided on a side surface between the arms 202b and 202c. The shutters 209a and 209b can press the cartridge to block flow paths in the cartridge. Each of the shutters may be driven by a Peltier element.

FIG. 24B is a plan view showing a state in which a group of rollers 201a to 201d and a group of rollers 201e to 201h are arranged in two rows adjacent to each other. The cartridge driving mechanism exhibits a ladder shape. The broken lines express rollers. The rollers 201a to 201d are attached to a base portion 225 through arms. The rollers 201e to 201h are attached to a base portion 226 through arms. Opening portions 204a to 204c are provided in the base portion 225. Opening portions 204d to 204f are provided in the base portion 226. Actuators not shown are inserted into the opening portions 204a to 204c and into the opening portions 204d to 204f. Shutters 209a to 209l are provided in side surfaces of the base portions 225 and 226. These shutters block a solution in a direction perpendicular to the direction of the movement of the rollers.

Figure 25:
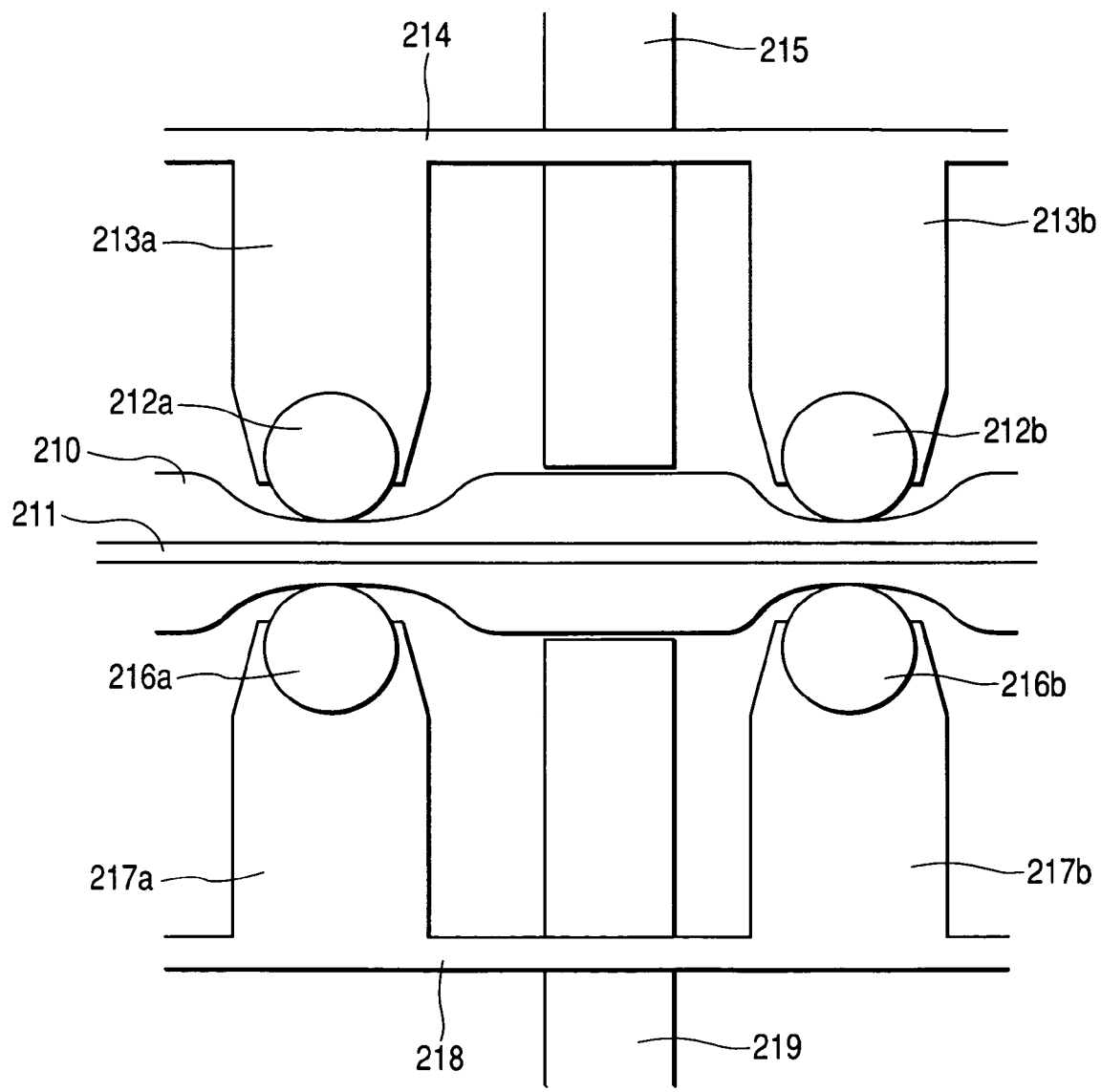
FIG. 25 is an explanatory view showing a nineteenth embodiment concerned with the chemical cartridge and the driving mechanism.

FIG. 25 is a configuration view showing a nineteenth embodiment of the chemical reaction cartridge and the driving mechanism according to the invention.

FIG. 25 shows a state in which the cartridge is pressed by the roller groups from above and below. The rollers 212a and 212b are supported by arms 213a and 213b respectively. The arms 213a and 213b are attached to a flat base portion 214.

The rollers 212a and 212b press the cartridge 210 from above on the basis of the vertical movement of the base portion 214 attached to a mechanical stage (not shown). When the base portion 214 is moved left and right while controlled by the stage, the rollers are rotated and moved while pressing the cartridge. Thus, the solution in the cartridge 210 is moved horizontally.

The rollers 216*a* and 216*b* are supported by arms 217*a* and 217*b* respectively. The arms 217*a* and 217*b* are attached to a flat base portion 218. The rollers 216*a* and 216*b* press the cartridge 210 from below on the basis of the vertical movement of the base portion 218 attached to a mechanical stage (not shown). When the base portion 218 is moved left and right while controlled by the stage, the rollers are rotated and moved while pressing the cartridge. Thus, the solution in the cartridge 210 is moved horizontally.

The actuator 215 applies pressure, vibration, heating, cooling, etc. on the upper surface of the cartridge 210 from above to thereby accelerate the chemical reaction in the cartridge 210. The actuator 219 applies pressure, vibration, heating, cooling, etc. on the lower surface of the cartridge 210 from below to thereby accelerate the chemical reaction in the cartridge 210.

The cartridge 210 has a substrate 211 in its inside. The substrate 211 is made of a rigid material (such as glass or resin). The cartridge 210 is formed to withstand pressure given from above and below. According to this configuration, solutions in flow paths or wells between which the substrate 211 is sandwiched in the cartridge 210 are moved independently. If a small hole is formed in a portion of the substrate in which a well is located as shown in FIG. 16E, upper and lower solutions can be moved across the substrate 211. Incidentally, also in this embodiment, shutters may be provided in side surfaces.

Figure 26:
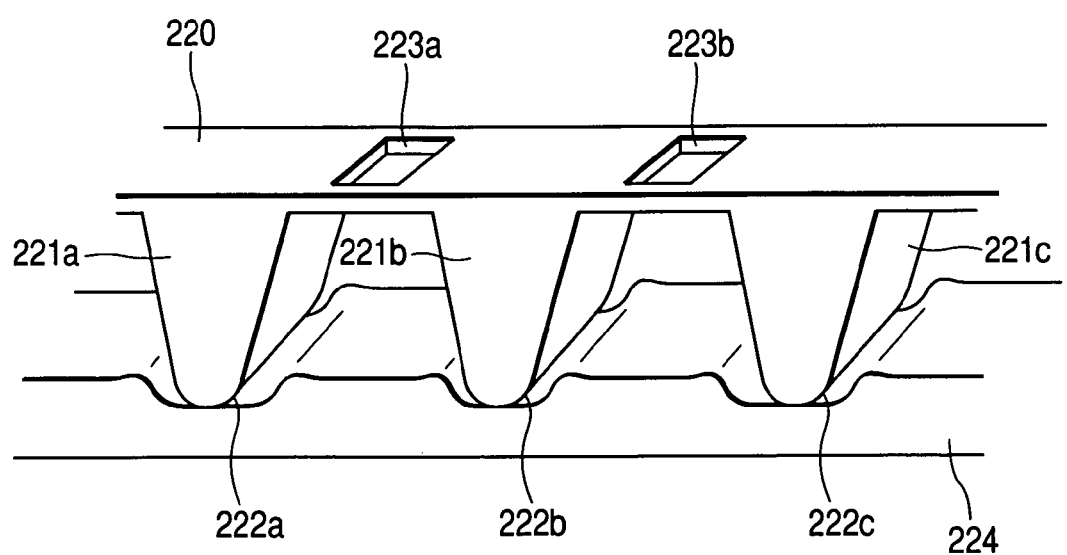
FIG. 26 is an explanatory view showing a twentieth embodiment concerned with the chemical cartridge and the driving mechanism.
Figure 27A:
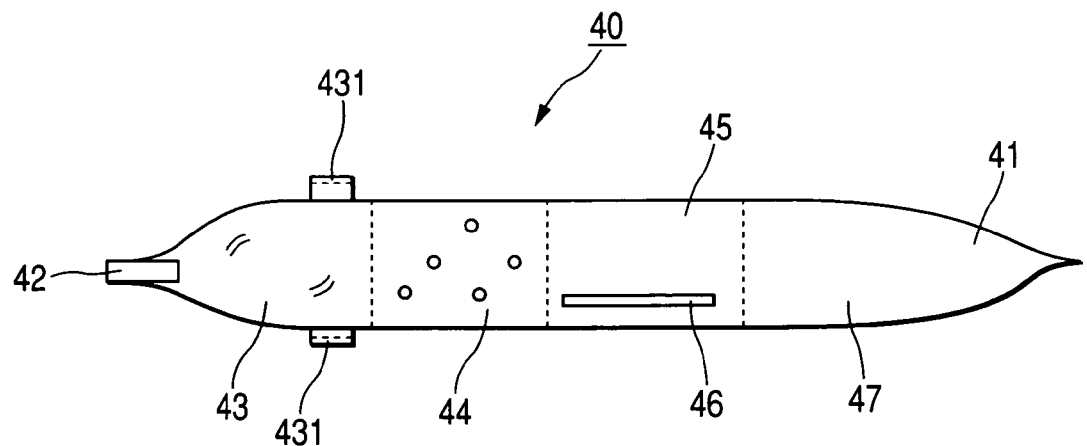
FIGS. 27A and 27B are configuration views of a biochip according to the background art.
Figure 27B:
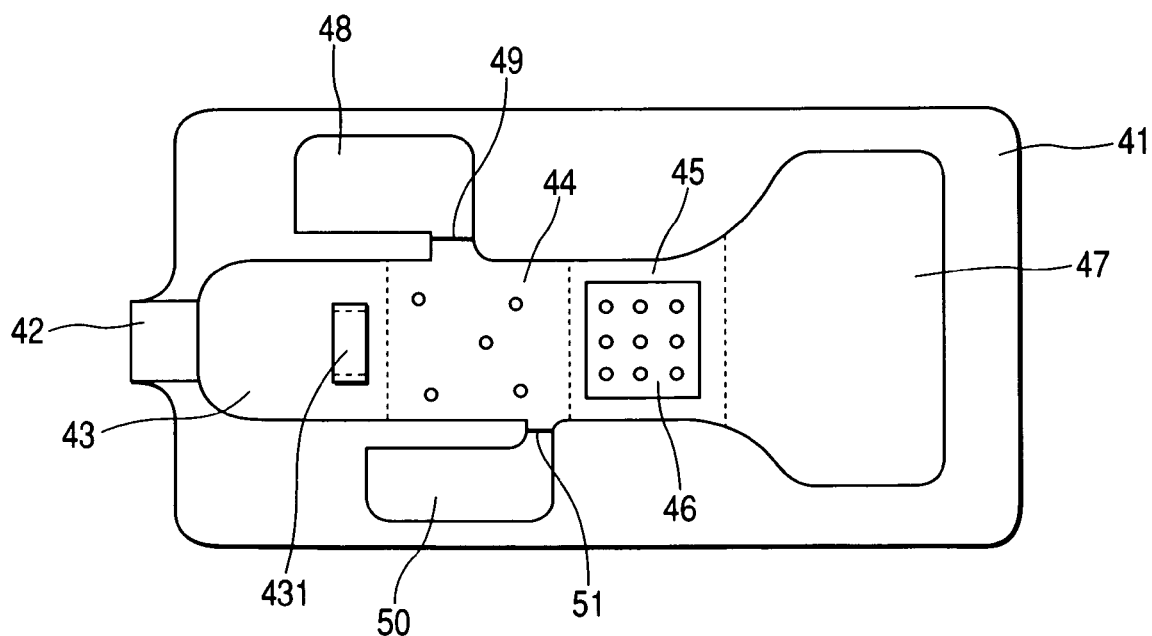
Figure 28:
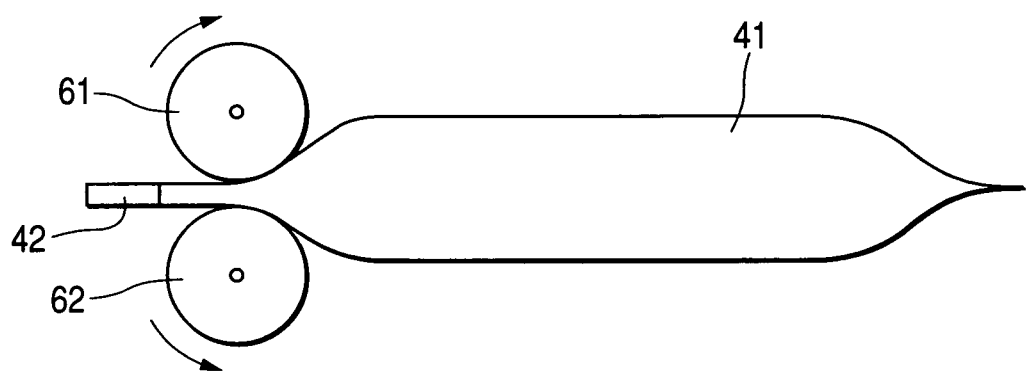
FIG. 28 is an explanatory view for explaining a method for operating a biochip according to the background art.

FIG. 26 is a configuration view showing a twentieth embodiment of the chemical reaction cartridge and the driving mechanism according to the invention. A base portion 220 has opening portions 223*a* and 223*b* formed in the same manner as described above for actuators, and arms 221*a* to 221*c* without any roller. Another form of pressing portions is provided. Ends of the arms 221*a* to 221*c* form curved surfaces 222*a*, 222*b* and 222*c*. The curved surfaces act instead of the rollers to reduce friction between the cartridge 224 and each arm. Even in the case where the cartridge is pressed by the arms, the cartridge can be moved horizontally easily. Accordingly, solution transport in the cartridge can be achieved without any roller.

For example, each of the arms is made of a fluororesin. If a fluororesin sheet is provided on a surface of the cartridge or the cartridge is coated with a fluororesin, friction can be reduced more greatly.

In this case, the end portion of each arm may be formed as a curved surface which cannot be formed by a roller. Accordingly, when the end portion of each arm is formed as a non-circular curved surface such as a paraboloid, a hyperboloid or a sinusoid, the end portion of each arm can be shaped in accordance with the material of the cartridge so that effective pressing can be made.

The number of arms, the number of rollers, the number of shutters, the number of actuators, etc. are not limited to the numbers shown in the drawings. The numbers can be changed if necessary.

For example, the aforementioned cartridge driving mechanism can be applied as a cartridge driving mechanism shown in FIGS. 9A to 9E, FIGS. 19A to 19C, FIG. 20 or FIG. 21B. In this case, the rollers are attached at regular intervals of a pitch equal to the pitch of the wells in the cartridge.

For example, in the cartridge shown in FIGS. 9A to 9E, the rollers are arranged at intervals of a pitch equal to the lateral pitch of the wells. Although only the rollers are shown in FIGS. 9A to 9E, the portion shown in FIGS. 9A to 9E is the driving mechanism shown in FIGS. 23A to 23C and these rollers are supported by arms attached to a base portion attached to a mechanical stage. In this manner, the cartridge driving mechanism can drive the cartridge up and down and left and right openings are provided in the base portion so as to be located in positions corresponding to the wells. In the condition that actuators are inserted into the openings, vibration, heating, etc. may be applied.

According to this configuration, all input and output flow paths of a chamber containing a fluid substance held therein are blocked simultaneously by each pressing portion of the cartridge driving mechanism. Accordingly, the fluid substance can be prevented from flowing not only into a next chamber but also into a chamber after the next well when the fluid substance is transported. Moreover, the solution can be prevented from flowing into another chamber when the solution is heated and vibrated. Moreover, the solution can be prevented from being pressed back by the back pressure of air. In addition, a structure (cross structure) for extraction and purification of DNA from a sample by using silica, magnetic particles or the like can be achieved.

The invention is not limited to the aforementioned embodiments and may contain more changes and modifications without departing from the spirit of the invention.

What is claimed is:

1. A chemical reaction cartridge comprising:
   a substrate; and
   an elastic body comprising a plurality of chambers formed therein and a plurality of flow paths connecting the plurality of chambers, the elastic body being configured to facilitate movement of a fluid substance through the flow paths and the chambers in response to an external force applied to the elastic body, to thereby perform a chemical reaction,
   wherein the substrate and the elastic body are adhesively bonded to each other in first regions, which are regions other than the flow paths and the chambers, and the substrate and the elastic body are not adhesively bonded but are only brought into contact with each other by an elastic force of the elastic body in second regions, which are regions comprising the flow paths and the chambers, the elastic body being adhesively bonded at the first regions and elastically stretched out across the second regions such that the flow paths and the chambers are configured to:
   take a first position in which a surface of the substrate and a surface of the elastic body directly contact each other at the second regions such that the flow paths and the chambers have zero volume before the fluid substance is moved by action of the external force, and
   take a second position in which the flow paths and the chambers have a volume corresponding to the fluid substance moved into the flow paths and the chambers by the action of the external force.

2. The chemical reaction cartridge according to claim 1,
   wherein the plurality of chambers are arranged at regular intervals of a pitch,
   at least one of the chambers is a common chamber having a plurality of inlet flow paths into which different fluid substances are input, and at least one outlet flow path, and
   at least one of the chambers is a dummy chamber for adjusting a timing of transporting a predetermined fluid substance into the common chamber.

3. The chemical reaction cartridge according to claim 1, further comprising:
   an entrance for storing a predetermined amount of the fluid substance; and a sucking portion which sucks the predetermined amount of the fluid substance stored in the entrance, into an inside part of one of the chambers.

4. The chemical reaction cartridge according to claim 1, wherein at least one of the chambers is a common chamber having a plurality of the flow paths functioning as inlet flow paths into which two or more kinds of different fluid substances flow respectively, and at least two of the flow paths functioning as outlet flow paths, and when one of the fluid substances flows into or from the common chamber, an inlet flow path for another fluid substance and the outlet flow paths are blocked by the external force.

5. The chemical reaction cartridge according to claim 4, wherein the flow paths into and from which the another fluid substance flows are formed in positions to be blocked by an external force used for transporting the one fluid substance.

6. The chemical reaction cartridge according to claim 4, wherein the plurality of chambers have convex portions which are pressed down when the external force is applied, and a flow path for transporting the one fluid substance is formed in concave portions between the convex portions.

7. The chemical reaction cartridge according to claim 1, wherein at least one of the chambers is a common chamber having a plurality of inlet flow paths into which two or more kinds of different fluid substances flow respectively, and at least two outlet flow paths, and a plurality of flow paths passing through the common chamber are arranged in each of rear and front surfaces of the chemical reaction cartridge.

8. The chemical reaction cartridge according to claim 1, wherein at least one of the chambers is a common chamber having a plurality of the flow paths through which two or more kinds of different fluid substances flow into and from the common chamber, and the flow paths of the common chamber are arranged adjacently and linearly with the common chamber as its center, and when one fluid substance flows into and from the common chamber, a flow path into which another fluid substance flows to flow into the common chamber is blocked by the external force.

9. The chemical reaction cartridge according to claim 1, wherein the plurality of chambers are arranged at regular intervals of a pitch, at least one of the chambers is a common chamber having a plurality of the flow paths functioning as inlet flow paths into which two or more kinds of different fluid substances flow respectively, and at least two of the flow paths functioning as outlet flow paths, and when one fluid substance flows into and from the common chamber, an inlet flow path into which another fluid substance flows is blocked by the external force.

10. The chemical reaction cartridge according to claim 9, further comprising a pressurizing portion, wherein a direction of movement of the pressurizing portion through which the external force is applied and a direction of one of the flow paths are different from each other.

11. The chemical reaction cartridge according to claim 10, wherein the direction of the flow path is at an angle of 90 degrees or lower with respect to the direction of the movement of the pressurizing portion.

12. The chemical reaction cartridge according to claim 9, further comprising a solid body formed on a side of the flow path, wherein an external force is applied on a part of the flow path so that a solid body forming portion blocks the flow path entirely.

13. The chemical reaction cartridge according to claim 10, further comprising a solid body formed on a side of the flow path, wherein an external force is applied on part of the flow path so that a solid body forming portion blocks the flow path entirely.

14. The chemical reaction cartridge according to claim 1, further comprising an implantable material that is provided in the second regions comprising the flow paths and the chambers between the substrate and the elastic body, wherein the substrate and the elastic body are brought into contact with the implantable material.

15. The chemical reaction cartridge according to claim 1, wherein, in the second regions, the flow paths and the chambers have a substantially complete absence of air therein such that an amount of air in the second regions is collectively less than a preset amount.

* * * * *